US011956049B2

(12) United States Patent
Zhou et al.

(10) Patent No.: US 11,956,049 B2
(45) Date of Patent: Apr. 9, 2024

(54) BEAM FAILURE DECLARATION AND REPORTING

(71) Applicant: QUALCOMM Incorporated, San Diego, CA (US)

(72) Inventors: Shanyu Zhou, San Diego, CA (US); Jelena Damnjanovic, Del Mar, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 230 days.

(21) Appl. No.: 17/501,361

(22) Filed: Oct. 14, 2021

(65) Prior Publication Data

US 2023/0125038 A1    Apr. 20, 2023

(51) Int. Cl.
*H04B 7/06* (2006.01)
*H04B 17/336* (2015.01)
*H04L 5/00* (2006.01)
*H04W 24/10* (2009.01)

(52) U.S. Cl.
CPC ......... *H04B 7/0695* (2013.01); *H04B 17/336* (2015.01); *H04L 5/0051* (2013.01); *H04W 24/10* (2013.01)

(58) Field of Classification Search
CPC ... H04B 7/0695; H04B 17/336; H04L 5/0051; H04W 24/10
See application file for complete search history.

(56) References Cited

U.S. PATENT DOCUMENTS

| 2019/0150010 A1* | 5/2019 | Kwon | H04W 24/10 |
| | | | 370/252 |
| 2022/0149924 A1* | 5/2022 | Zhang | H04W 72/1263 |
| 2022/0201581 A1* | 6/2022 | Li | H04W 36/0085 |
| 2022/0256387 A1* | 8/2022 | Xiao | H04W 24/08 |
| 2023/0028423 A1* | 1/2023 | Xu | H04W 36/06 |
| 2023/0044880 A1* | 2/2023 | Cao | H04L 5/0094 |
| 2023/0104716 A1* | 4/2023 | Zhou | H04W 76/19 |
| | | | 370/329 |

FOREIGN PATENT DOCUMENTS

WO    WO-2022148398 A1 *   7/2022

* cited by examiner

*Primary Examiner* — Deepa Belur
(74) *Attorney, Agent, or Firm* — Arun Swain

(57) ABSTRACT

This disclosure provides systems, methods and apparatus, including computer programs encoded on computer storage media, for signaling mechanisms associated with reporting information associated with multiple beam failure indicator (BFI) types via a beam failure detection (BFD) report. In some aspects, a user equipment (UE) may measure a periodic reference signal as part of a BFD procedure and may report a BFI if the UE measures that the reference signal fails to satisfy a threshold signal strength or quality. The UE may further detect or classify each reported BFI as one of multiple BFI types and may store information associated with respective numbers of the multiple BFI types in accordance with the detection or classification. In scenarios in which the UE declares beam failure, the UE may transmit a BFD report including the information associated with the respective numbers of the multipole BFI types.

30 Claims, 7 Drawing Sheets

BEAM FAILURE DECLARATION AND REPORTING

TECHNICAL FIELD

This disclosure relates to wireless communications, including beam failure declaration and reporting.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations (BSs) or one or more network access nodes, each simultaneously supporting communication for multiple communication devices, which may be otherwise known as user equipment (UE).

A UE may communicate with a BS using directional communication. For example, the BS may transmit signaling to the UE using a first directional beam. To maintain a reliable communication link between the UE and the BS, the BS may periodically transmit a reference signal to the UE using the first directional beam and the UE may measure or monitor an error rate associated with the reference signal.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communications at a user equipment (UE). The method may include receiving, from a network entity, a set of one or more control messages indicating a set of one or more parameters associated with measurement, by the UE, of one or more reference signals, receiving the one or more reference signals in accordance with the set of one or more parameters, and transmitting, to the network entity, a report including information related to a number of interference-based beam failure indicators (BFIs) and a number of noise-based BFIs associated with the measurement of the one or more reference signals according to the set of one or more parameters.

Another innovative aspect of the subject matter described in this disclosure can be implemented in an apparatus for wireless communications at a UE. The apparatus may include a first interface, a second interface, and a processing system. The first interface may be configured to obtain, from a network entity, a set of one or more control messages indicating a set of one or more parameters associated with measurement, by the UE, of one or more reference signals and obtain the one or more reference signals in accordance with the set of one or more parameters. The first interface or the second interface may be configured to output, to the network entity, a report including information related to a number of interference-based BFIs and a number of noise-based BFIs associated with the measurement of the one or more reference signals according to the set of one or more parameters.

Another innovative aspect of the subject matter described in this disclosure can be implemented in an apparatus for wireless communications at a UE. The apparatus may include a processor, memory coupled with the processor, and instructions stored in the memory. The instructions may be executable by the processor to cause the apparatus to receive, from a network entity, a set of one or more control messages indicating a set of one or more parameters associated with measurement, by the UE, of one or more reference signals, receive the one or more reference signals in accordance with the set of one or more parameters, and transmit, to the network entity, a report including information related to a number of interference-based BFIs and a number of noise-based BFIs associated with the measurement of the one or more reference signals according to the set of one or more parameters.

Another innovative aspect of the subject matter described in this disclosure can be implemented in another apparatus for wireless communications at a UE. The apparatus may include means for receiving, from a network entity, a set of one or more control messages indicating a set of one or more parameters associated with measurement, by the UE, of one or more reference signals, means for receiving the one or more reference signals in accordance with the set of one or more parameters, and means for transmitting, to the network entity, a report including information related to a number of interference-based BFIs and a number of noise-based BFIs associated with the measurement of the one or more reference signals according to the set of one or more parameters.

Another innovative aspect of the subject matter described in this disclosure can be implemented in a non-transitory computer-readable medium storing code for wireless communications at a UE. The code may include instructions executable by a processor to receive, from a network entity, a set of one or more control messages indicating a set of one or more parameters associated with measurement, by the UE, of one or more reference signals, receive the one or more reference signals in accordance with the set of one or more parameters, and transmit, to the network entity, a report including information related to a number of interference-based BFIs and a number of noise-based BFIs associated with the measurement of the one or more reference signals according to the set of one or more parameters.

Some implementations of the method, apparatuses, and non-transitory computer-readable medium described herein may further include operations, features, means, or instructions for incrementing a first counter associated with interference-based BFIs based on a set of one or more identified interference-based BFIs associated with the measurement of the one or more reference signals, where the number of interference-based BFIs may be included in the report based on the first counter.

Some implementations of the method, apparatuses, and non-transitory computer-readable medium described herein may further include operations, features, means, or instructions for incrementing a second counter associated with noise-based BFIs based on a set of one or more identified noise-based BFIs associated with the measurement of the one or more reference signals, where the number of noise-based BFIs may be included in the report based on the second counter.

In some implementations of the method, apparatuses, and non-transitory computer-readable medium described herein, transmitting the report may include operations, features, means, or instructions for transmitting, in the report, an indication of a percentage of the number of interference-based BFIs or the number of noise-based BFIs relative to a total number of BFIs detected by the UE.

In some implementations of the method, apparatuses, and non-transitory computer-readable medium described herein, transmitting the report may include operations, features, means, or instructions for transmitting, in the report, an indication of a pattern associated with the number of interference-based BFIs, the number of noise-based BFIs, or both.

One innovative aspect of the subject matter described in this disclosure can be implemented in a method for wireless communications at a network entity. The method may include transmitting, to a UE, a set of one or more control messages indicating a set of one or more parameters associated with measurement, by the UE, of one or more reference signals, transmitting the one or more reference signals in accordance with the set of one or more parameters, and receiving, from the UE, a report including information related to a number of interference-based BFIs and a number of noise-based BFIs associated with the measurement of the one or more reference signals according to the set of one or more parameters.

Another innovative aspect of the subject matter described in this disclosure can be implemented in an apparatus for wireless communications at a network entity. The apparatus may include a first interface, a second interface, and a processing system. The first interface may be configured to output, to a UE, a set of one or more control messages indicating a set of one or more parameters associated with measurement, by the UE, of one or more reference signals and output the one or more reference signals in accordance with the set of one or more parameters. The first interface or the second interface may be configured to obtain, from the UE, a report including information related to a number of interference-based BFIs and a number of noise-based BFIs associated with the measurement of the one or more reference signals according to the set of one or more parameters.

Another innovative aspect of the subject matter described in this disclosure can be implemented in another apparatus for wireless communications at a network entity. The apparatus may include a processor, memory coupled with the processor, and instructions stored in the memory. The instructions may be executable by the processor to cause the apparatus to transmit, to a UE, a set of one or more control messages indicating a set of one or more parameters associated with measurement, by the UE, of one or more reference signals, transmit the one or more reference signals in accordance with the set of one or more parameters, and receive, from the UE, a report including information related to a number of interference-based BFIs and a number of noise-based BFIs associated with the measurement of the one or more reference signals according to the set of one or more parameters.

Another innovative aspect of the subject matter described in this disclosure can be implemented in another apparatus for wireless communications at a network entity. The apparatus may include means for transmitting, to a UE, a set of one or more control messages indicating a set of one or more parameters associated with measurement, by the UE, of one or more reference signals, means for transmitting the one or more reference signals in accordance with the set of one or more parameters, and means for receiving, from the UE, a report including information related to a number of interference-based BFIs and a number of noise-based BFIs associated with the measurement of the one or more reference signals according to the set of one or more parameters.

Another innovative aspect of the subject matter described in this disclosure can be implemented in a non-transitory computer-readable medium storing code for wireless communications at a network entity. The code may include instructions executable by a processor to transmit, to a UE, a set of one or more control messages indicating a set of one or more parameters associated with measurement, by the UE, of one or more reference signals, transmit the one or more reference signals in accordance with the set of one or more parameters, and receive, from the UE, a report including information related to a number of interference-based BFIs and a number of noise-based BFIs associated with the measurement of the one or more reference signals according to the set of one or more parameters.

In some implementations of the method, apparatuses, and non-transitory computer-readable medium described herein, receiving the report may include operations, features, means, or instructions for receiving, in the report, an indication of a percentage of the number of interference-based BFIs or the number of noise-based BFIs relative to a total number of BFIs detected by the UE.

In some implementations of the method, apparatuses, and non-transitory computer-readable medium described herein, receiving the report may include operations, features, means, or instructions for receiving, in the report, an indication of a pattern associated with the number of interference-based BFIs, the number of noise-based BFIs, or both.

In some implementations of the method, apparatuses, and non-transitory computer-readable medium described herein, receiving the report may include operations, features, means, or instructions for receiving, in the report, an indication of a set of consecutive BFIs over a set of transmission time intervals detected by the UE, the set of consecutive BFIs associated with one of the number of interference-based BFIs or the number of noise-based BFIs.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
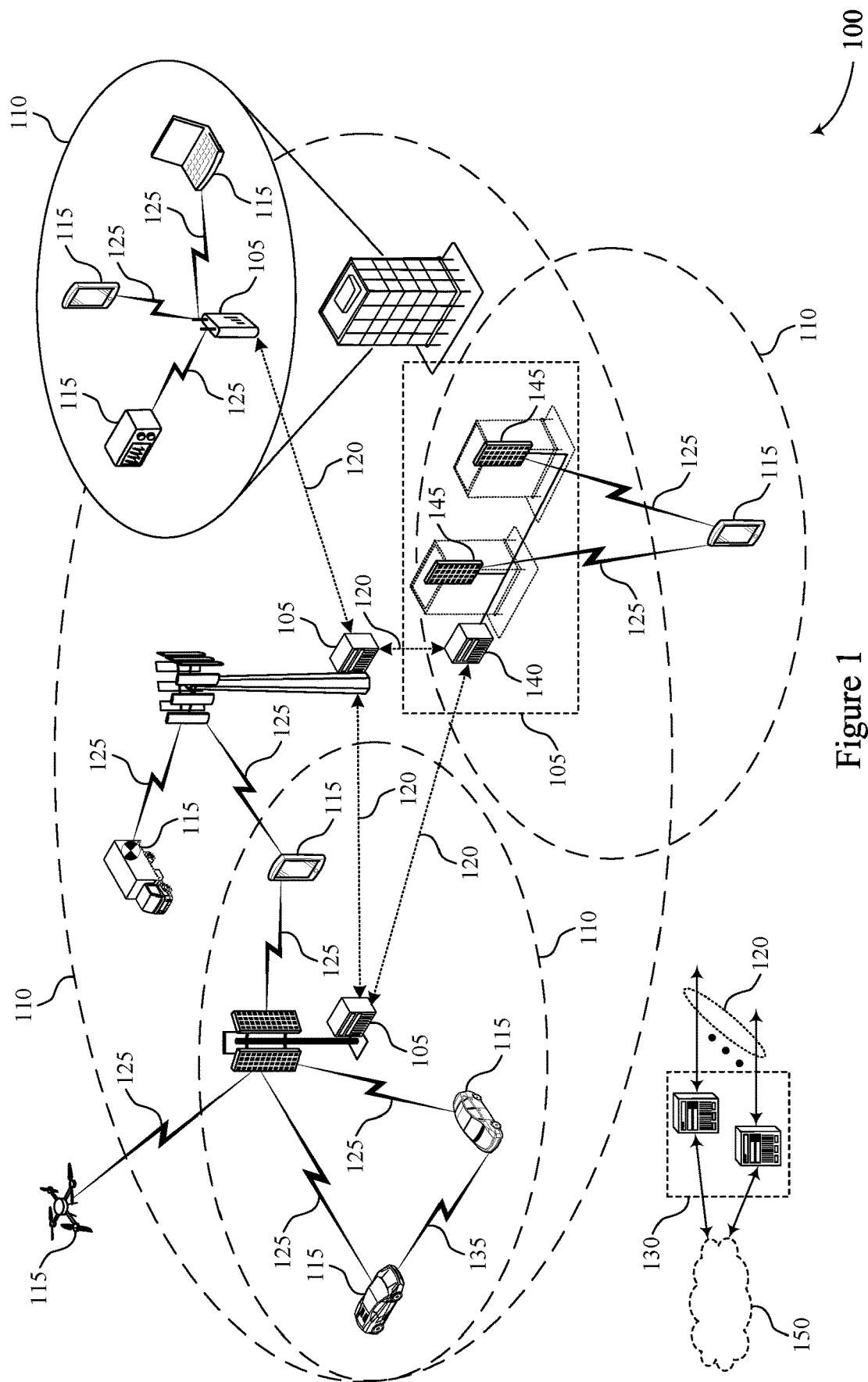
FIG. 1 illustrates an example wireless communications system that supports beam failure declaration and reporting.

The following description is directed to some implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving radio frequency (RF) signals according to any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (TOT) network, such as a system utilizing third generation (3G), fourth generation (4G) or fifth generation (5G), or further implementations thereof, technology.

In some wireless communications systems, a user equipment (UE) and a network entity (such as one or more components of a base station (BS), which may be co-located, geographically distributed, or virtually distributed) may communicate with each other using directional communication beams. For example, one or both of the UE or the network entity may support configurations for directional communication according to which the UE or the network entity may direct or focus signaling in one of various directions, and such directional communication may be referred to herein as communicating using a directional beam or beamforming communication. For example, the network entity may transmit signaling to the UE using a first directional beam that focuses the signaling to the UE. To maintain link reliability for directional communication, the network entity may periodically transmit a reference signal to the UE using the first directional beam and the UE may measure an error rate associated with the reference signal. In some implementations, and if the measured error rate exceeds a threshold error rate, the UE may generate a beam failure indicator (BFI) report and may increment a BFI count for each BFI report. If the BFI count exceeds a threshold BFI count prior to an expiration of a beam failure detection (BFD) timer, the UE may transmit an indication of BFD to the network entity. In some systems, such a reporting of BFD may lack any information associated with a context of the detected beam failure, which may inhibit a capability of the UE or the network entity to make adjustments to reduce a likelihood for future beam failures.

In some implementations of the present disclosure, the UE and the network entity may support BFD reporting that includes or otherwise conveys information relating to a context of a detected beam failure. For example, as part of a BFD procedure, the UE may measure the periodic reference signals transmitted by the network entity, may keep an accounting of multiple different types of BFIs associated with the measuring, and may transmit a BFD report including information associated with the different types of BFIs. In some aspects, the multiple different types of BFIs that the UE accounts for may include an interference-based BFI type and a noise-based BFI type. In such aspects, the UE may classify a BFI as an interference-based BFI or as a noise-based BFI and may store information relating to which BFIs are classified as interference-based BFIs and which BFIs are classified as noise-based BFIs. Such information relating to which BFIs are interference-based BFIs and which BFIs are noise-based BFIs may include a first count of interference-based BFIs and a second count for noise-based BFIs, one or more percentages associated with how many BFIs are interference-based BFIs and how many BFIs are noise-based BFIs, or one or more indications associated with a set of consecutive interference-based BFIs and a set of consecutive noise-based BFIs. Additionally, or alternatively, such information may include an indication of a pattern, a partial history, or a complete history of which BFIs are interference-based BFIs and which BFIs are noise-based BFIs. The UE may transmit the information relating to which BFIs are interference-based BFIs and which BFIs are noise-based BFIs to the network entity via the BFD report.

Particular implementations of the subject matter described in this disclosure can be implemented to realize one or more of the following potential advantages. For example, as a result of including or otherwise conveying information relating to a context of a detected beam failure (such as information relating to which types of BFIs the UE detects) in the BFD report, the UE may provide the network entity with a more complete understanding or knowledge of why the beam failure occurred, which the network entity may use for future communication configurations to reduce a probability of future beam failures. In some implementations, for instance, the network entity may use the information provided by the UE via the BFD report to more suitably or accurately select a new beam to replace the failing beam, which may support the reduced probability for future beam failures. Further, and as a result of the reduced probability for future beam failures or the reporting of information associated with the multiple types of BFIs, the UE and the network entity may achieve greater spectral efficiency, higher reliability, higher data rates, and greater system capacity, among other benefits. Additionally, and potentially also as a result of the reduced probability for future beam failures or the reporting of information associated with the multiple types of BFIs, the UE and the network entity may achieve reduced energy consumption and lower latency.

FIG. 1 illustrates an example wireless communications system 100 that supports beam failure declaration and reporting. The wireless communications system 100 may include one or more BSs 105, one or more UEs 115, and a core network 130. In some implementations, the wireless communications system 100 may be a Long Term Evolution (LTE) network, an LTE-Advanced (LTE-A) network, an LTE-A Pro network, or a New Radio (NR) network. In some implementations, the wireless communications system 100 may support enhanced broadband communications, ultra-reliable (for example, mission expected) communications, low latency communications, communications with low-cost and low-complexity devices, or any combination thereof.

The BSs 105 may be dispersed throughout a geographic area to form the wireless communications system 100 and may be devices in different forms or having different capabilities. The BSs 105 and the UEs 115 may wirelessly communicate via one or more communication links 125. Each BS 105 may provide a geographic coverage area 110 over which the UEs 115 and the BS 105 may establish one or more communication links 125. The geographic coverage area 110 may be an example of a geographic area over which a BS 105 and a UE 115 may support the communication of signals according to one or more radio access technologies.

The UEs 115 may be dispersed throughout a geographic coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the BSs 105, or network equipment (for example, core network nodes, relay devices, integrated access and backhaul (IAB) nodes, or other network equipment), as shown in FIG. 1.

The BSs 105 may communicate with the core network 130, or with one another, or both. For example, the BSs 105 may interface with the core network 130 through one or more backhaul links 120 (for example, via an S1, N2, N3, or another interface). The BSs 105 may communicate with one another over the backhaul links 120 (for example, via an X2, Xn, or another interface) either directly (for example, directly between BSs 105), or indirectly (for example, via core network 130), or both. In some implementations, the backhaul links 120 may be or include one or more wireless links.

One or more of the BSs 105 described herein may include or may be referred to by a person having ordinary skill in the art as a base transceiver station, a radio BS, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" also may be referred to as a unit, a station, a terminal, or a client, among other examples. A UE 115 also may include or may be referred to as a personal electronic device such as a cellular phone, a personal digital assistant (PDA), a tablet computer, a laptop computer, or a personal computer. In some implementations, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other implementations.

The UEs 115 described herein may be able to communicate with various types of devices, such as other UEs 115 that may sometimes act as relays as well as the BSs 105 and the network equipment including macro eNBs or gNBs, small cell eNBs or gNBs, or relay BSs, among other implementations, as shown in FIG. 1.

The UEs 115 and the BSs 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (for example, a bandwidth part (BWP)) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation (CA) or multi-carrier operation. A UE 115 may be configured with multiple downlink component carriers and one or more uplink component carriers according to a CA configuration. CA may be used with both frequency division duplexing (FDD) and time division duplexing (TDD) component carriers.

In some implementations (for example, in a CA configuration), a carrier also may have acquisition signaling or control signaling that coordinates operations for other carriers. A carrier may be associated with a frequency channel (for example, an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (for example, of the same or a different radio access technology).

The communication links 125 shown in the wireless communications system 100 may include uplink transmissions from a UE 115 to a BS 105, or downlink transmissions from a BS 105 to a UE 115. Carriers may carry downlink or uplink communications (for example, in an FDD mode) or may be configured to carry downlink and uplink communications (for example, in a TDD mode).

A carrier may be associated with a particular bandwidth of the radio frequency spectrum, and in some implementations the carrier bandwidth may be referred to as a "system bandwidth" of the carrier or the wireless communications system 100. For example, the carrier bandwidth may be one of a number of determined bandwidths for carriers of a particular radio access technology (for example, 1.4, 3, 5, 10, 15, 20, 40, or 80 megahertz (MHz)). Devices of the wireless communications system 100 (for example, the BSs 105, the UEs 115, or both) may have hardware configurations that support communications over a particular carrier bandwidth or may be configurable to support communications over one of a set of carrier bandwidths. In some implementations, the wireless communications system 100 may include BSs 105 or UEs 115 that support simultaneous communications via carriers associated with multiple carrier bandwidths. In some implementations, each served UE 115 may be configured for operating over portions (for example, a sub-band, a BWP) or all of a carrier bandwidth.

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (for example, a duration of one modulation symbol) and one subcarrier, where the symbol period and subcarrier spacing are inversely related. The quantity of bits carried by each resource element may depend on the modulation scheme (for example, the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some implementations, a UE 115 may be configured with multiple BWPs. In some implementations, a single BWP for a carrier may be active at a given time and communications for the UE 115 may be restricted to one or more active BWPs.

The time intervals for the BSs 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some implementations, a frame may be divided (for example, in the time domain) into subframes, and each subframe may be further divided into a number of slots. Alternatively, each frame may include a variable number of slots, and the number of slots may depend on subcarrier spacing. Each slot may include a number of symbol periods (for example, depending on the length of the cyclic prefix prepended to each symbol period). In some wireless communications systems 100, a slot may further be divided into multiple mini-slots containing one or more symbols. Excluding the cyclic prefix, each symbol period may contain one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some implementations, the TTI duration (for example, the number of symbol periods in a TTI) may be variable. Additionally, or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a number of symbol periods and may extend across the system bandwidth or a subset of the system bandwidth of the carrier. One or more control regions (for example, CORE-SETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

Each BS 105 may provide communication coverage via one or more cells, for example a macro cell, a small cell, a hot spot, or other types of cells, or any combination thereof. The term "cell" may refer to a logical communication entity used for communication with a BS 105 (for example, over a carrier) and may be associated with an identifier for distinguishing neighboring cells (for example, a physical cell identifier (PCID), a virtual cell identifier (VCID), or others). In some implementations, a cell also may refer to a geographic coverage area 110 or a portion of a geographic coverage area 110 (for example, a sector) over which the logical communication entity operates. Such cells may range from smaller areas (for example, a structure, a subset of structure) to larger areas depending on various factors such as the capabilities of the BS 105. For example, a cell may be or include a building, a subset of a building, or exterior spaces between or overlapping with geographic coverage areas 110, among other implementations.

A macro cell generally covers a relatively large geographic area (for example, several kilometers in radius) and may allow unrestricted access by the UEs 115 with service subscriptions with the network provider supporting the macro cell. A small cell may be associated with a lower-powered BS 105, as compared with a macro cell, and a small cell may operate in the same or different (for example, licensed, unlicensed) frequency bands as macro cells. Small cells may provide unrestricted access to the UEs 115 with service subscriptions with the network provider or may provide restricted access to the UEs 115 having an association with the small cell (for example, the UEs 115 in a closed subscriber group (CSG), the UEs 115 associated with users in a home or office). A BS 105 may support one or multiple cells and also may support communications over the one or more cells using one or multiple component carriers.

In some implementations, a carrier may support multiple cells, and different cells may be configured according to different protocol types (for example, MTC, narrowband IoT (NB-IoT), enhanced mobile broadband (eMBB)) that may provide access for different types of devices.

In some implementations, a BS 105 may be movable and therefore provide communication coverage for a moving geographic coverage area 110. In some implementations, different geographic coverage areas 110 associated with different technologies may overlap, but the different geographic coverage areas 110 may be supported by the same BS 105. In some other implementations, the overlapping geographic coverage areas 110 associated with different technologies may be supported by different BSs 105. The wireless communications system 100 may include, for example, a heterogeneous network in which different types of the BSs 105 provide coverage for various geographic coverage areas 110 using the same or different radio access technologies.

The wireless communications system 100 may support synchronous or asynchronous operation. For synchronous operation, the BSs 105 may have similar frame timings, and transmissions from different BSs 105 may be approximately aligned in time. For asynchronous operation, the BSs 105 may have different frame timings, and transmissions from different BSs 105 may, in some implementations, not be aligned in time. The techniques described herein may be used for either synchronous or asynchronous operations.

Some UEs 115, such as MTC or IoT devices, may be low cost or low complexity devices and may provide for automated communication between machines (for example, via Machine-to-Machine (M2M) communication). M2M communication or MTC may refer to data communication technologies that allow devices to communicate with one another or a BS 105 without human intervention. In some implementations, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (for example, a mode that supports one-way communication via transmission or reception, but not transmission and reception simultaneously). In some implementations, half-duplex communications may be performed at a reduced peak rate. Other power conservation techniques for the UEs 115 include entering a power saving deep sleep mode when not engaging in active communications, operating over a limited bandwidth (for example, according to narrowband communications), or a combination of these techniques. For example, some UEs 115 may be configured for operation using a narrowband protocol type that is associated with a defined portion or range (for example, set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (for example, mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some implementations, a UE 115 also may be able to communicate directly with other UEs 115 over a device-to-device (D2D) communication link 135 (for example, using a peer-to-peer (P2P) or D2D protocol). One or more UEs 115 utilizing D2D communications may be within the geographic coverage area 110 of a BS 105. Other UEs 115 in such a group may be outside the geographic coverage area 110 of a BS 105 or be otherwise unable to receive transmissions from a BS 105. In some implementations, groups of the UEs 115 communicating via D2D communications may utilize a one-to-many (1-M) system in which each UE 115 transmits to every other UE 115 in the group. In some implementations, a BS 105 facilitates the scheduling of resources for D2D communications. In some other implementations, D2D communications are carried out between the UEs 115 without the involvement of a BS 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the BSs 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a BS 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or BS 105 may be distributed across various network devices (for example, radio heads and ANCs) or consolidated into a single network device (for example, a BS 105). In various implementations, a BS 105, or an access network entity 140, or a core network 130, or some subcomponent thereof, may be referred to as a network entity.

As described herein, a BS 105 may include components that are located at a single physical location or components located at various physical locations. In examples in which the BS 105 includes components that are located at various physical locations, the various components may each perform various functions such that, collectively, the various components achieve functionality that is similar to a BS 105 that is located at a single physical location. As such, a BS 105 described herein may equivalently refer to a standalone BS 105 or a BS 105 including components that are located at various physical locations or virtualized locations. In some implementations, such a BS 105 including components that are located at various physical locations may be referred to as or may be associated with a disaggregated radio access network (RAN) architecture, such as an Open RAN (O-RAN) or Virtualized RAN (VRAN) architecture. In some implementations, such components of a BS 105 may include or refer to one or more of a central unit (CU), a distributed unit (DU), or a radio unit (RU).

The wireless communications system 100 may operate using one or more frequency bands, sometimes in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 also may operate in a super high frequency (SHF) region using frequency bands from 3 GHz to 30 GHz, also known as the centimeter band, or in an extremely high frequency (EHF) region of the spectrum (for example, from 30 GHz to 300 GHz), also known as the millimeter band. In some implementations, the wireless communications system 100 may support millimeter wave (mmW) communications between the UEs 115 and the BSs 105, and EHF antennas of the respective devices may be smaller and more closely spaced than UHF antennas. In some implementations, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the BSs 105 and the UEs 115 may employ carrier sensing for collision detection and avoidance. In some implementations, operations in unlicensed bands may be associated with a CA configuration in conjunction with component carriers operating in a licensed band (for example, LAA). Operations in unlicensed spectrum may include downlink transmissions, uplink transmissions, P2P transmissions, or D2D transmissions, among other transmissions.

A BS 105 or a UE 115 may be equipped with multiple antennas, which may be used to employ techniques such as transmit diversity, receive diversity, multiple-input multiple-output (MIMO) communications, or beamforming. The antennas of a BS 105 or a UE 115 may be located within one or more antenna arrays or antenna panels, which may support MIMO operations or transmit or receive beamforming. For example, one or more BS antennas or antenna arrays may be co-located at an antenna assembly, such as an antenna tower. In some implementations, antennas or antenna arrays associated with a BS 105 may be located in diverse geographic locations. A BS 105 may have an antenna array with a number of rows and columns of antenna ports that the BS 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which also may be referred to as spatial filtering, directional transmission, or directional reception, is a signal processing technique that may be used at a transmitting device or a receiving device (for example, a BS 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

A BS 105 or a UE 115 may use beam sweeping techniques as part of beam forming operations. For example, a BS 105 may use multiple antennas or antenna arrays (for example, antenna panels) to conduct beamforming operations for directional communications with a UE 115. Some signals (for example, synchronization signals, reference signals, beam selection signals, or other control signals) may be transmitted by a BS 105 multiple times in different directions. For example, the BS 105 may transmit a signal according to different beamforming weight sets associated with different directions of transmission. Transmissions in different beam directions may be used to identify (for example, by a transmitting device, such as a BS 105, or by a receiving device, such as a UE 115) a beam direction for later transmission or reception by the BS 105.

Some signals, such as data signals associated with a particular receiving device, may be transmitted by a BS 105 in a single beam direction (for example, a direction associated with the receiving device, such as a UE 115). In some implementations, the beam direction associated with transmissions along a single beam direction may be determined in accordance with a signal that was transmitted in one or more beam directions. For example, a UE 115 may receive one or more of the signals transmitted by the BS 105 in different directions and may report to the BS 105 an indication of the signal that the UE 115 received with a highest signal quality or an otherwise acceptable signal quality.

In some implementations, transmissions by a device (for example, by a BS 105 or a UE 115) may be performed using multiple beam directions, and the device may use a combination of digital precoding or radio frequency beamforming to generate a combined beam for transmission (for example, from a BS 105 to a UE 115). The UE 115 may report feedback that indicates precoding weights for one or more beam directions, and the feedback may correspond to a configured number of beams across a system bandwidth or one or more sub-bands. The BS 105 may transmit a reference signal (for example, a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (for example, a multi-panel type codebook, a linear combination type codebook, a port selection type codebook). Although these techniques are described with reference to signals transmitted in one or more directions by a BS 105, a UE 115 may employ similar techniques for transmitting signals multiple times in different directions (for example, for identifying a beam direction for subsequent transmission or reception by the UE 115) or for transmitting a signal in a single direction (for example, for transmitting data to a receiving device).

A receiving device (for example, a UE 115) may try multiple receive configurations (for example, directional listening) when receiving various signals from the BS 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (for example, different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some implementations, a receiving device may use a single receive configuration to receive along a single beam direction (for example, when receiving a data signal). The single receive configuration may be aligned in a beam direction determined in accordance with listening according to different receive configuration directions (for example, a beam direction determined to have a highest signal strength, highest signal-to-noise ratio (SNR), or otherwise acceptable signal quality in accordance with listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer also may use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a BS 105 or a core network 130 supporting radio bearers for user plane data. At the physical layer, transport channels may be mapped to physical channels.

The UEs 115 and the BSs 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, low signal-to-noise conditions). In some implementations, a device may support same-slot HARQ feedback, where the device may provide HARQ feedback in a specific slot for data received in a previous symbol in the slot. In some other implementations, the device may provide HARQ feedback in a subsequent slot, or according to some other time interval.

In some systems, such as the wireless communications system 100, the UE 115 may communicate with one or more components of a BS 105 using one or more directional communication beams. For example, one or more components of the BS 105 may transmit signaling to the UE 115 via a first beam that provides an area of constructive interference for the signaling at an approximate location of the UE 115. In some implementations, the UE 115 and one or more components of the BS 105 may support a BFD procedure to maintain a reliability of a communication link 125 between the UE 115 and one or more components of the BS 105. For example, as part of the BFD procedure, one or more components of the BS 105 may transmit a reference signal to the UE 115 using the first beam and the UE 115 may use the reference signal to measure one or more of a receive power, a signal quality, or an error rate associated with the reference signal. If the UE 115 measures a receive power, a signal quality, or an error rate associated with the reference signal that fails to satisfy a threshold, the UE 115 may generate a BFI report at a physical (PHY) layer of the UE 115 and may send the BFI report to a MAC layer of the UE 115. As used herein, satisfying a threshold may mean that the metric exceeds the threshold, or meets or exceeds the threshold.

In some implementations, the UE 115 may report one of multiple different BFI types for each BFI report generated by the UE 115. For example, the UE 115 may measure or detect a BFI due to noise (which may be referred to herein as a noise-based BFI) or a BFI due to interference (which may be referred to herein as an interference-based BFI) and, in some implementations, may account for the different BFI types separately in addition to accounting for all BFIs (such as a total BFI count reflecting BFIs of all BFI types). Such a BFI due to noise may be associated with a deteriorating channel condition (a pathloss associated with shadowing, fading, or blocking) of the UE 115 and such a BFI due to interference may be associated with a level of system congestion (such as inter-cell interference or intra-cell interference from other transmitting wireless devices). In some implementations, the UE 115 may maintain a first counter associated with all measured, detected, or reported BFIs, a second counter associated with interference-based BFIs, and may maintain a third counter associated with noise-based BFIs, or may maintain any other information associated with which BFIs are interference-based BFIs and which BFIs are noise-based BFIs.

As such, if the UE 115 reports a threshold quantity of BFIs (such as a threshold quantity of total BFIs including both interference-based BFIs and noise-based BFIs), the UE 115 may transmit a BFD report to one or more components of the BS 105 including information relating to the number of detected interference-based BFIs and the number of detected noise-based BFIs. In such implementations, one or more components of the BS 105 may use the information relating to the number of detected interference-based BFIs and the number of detected noise-based BFIs to select a replacement beam to use for communication with the UE 115 or to otherwise re-configure communication between the UE 115 and one or more components of the BS 105.

Figure 2:
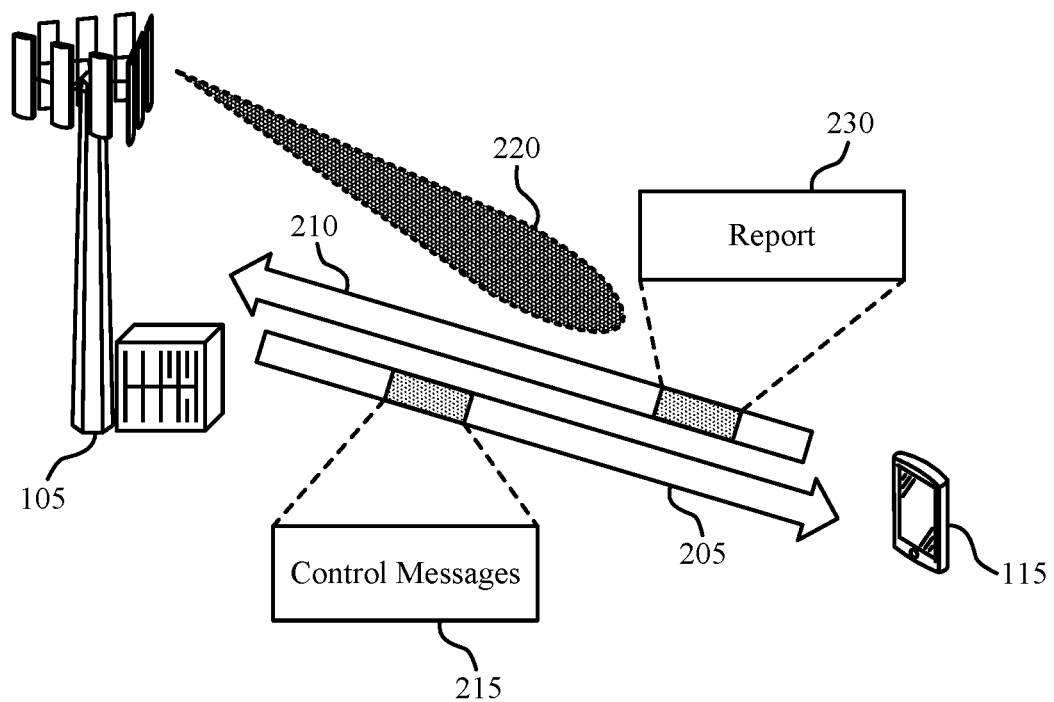
FIG. 2 illustrates an example signaling diagram that supports beam failure declaration and reporting.
Figure 2:
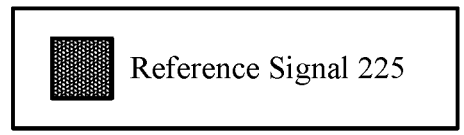

FIG. 2 illustrates an example signaling diagram 200 that supports beam failure declaration and reporting. The signaling diagram 200 may implement or be implemented to realize one or more aspects of the wireless communications system 100. For example, the signaling diagram 200 illustrates communication between a UE 115 and one or more components of a BS 105. The UE 115 of FIG. 2 may be an example of a UE 115 as illustrated by and described with reference to FIG. 1. The one or more components of the BS 105 of FIG. 2 may be examples of one or more components of a BS 105 as illustrated by and described with reference to FIG. 1 and may include or refer to components that are co-located with each other or that are distributed, such as in a disaggregated RAN, O-RAN, or VRAN architecture. In some implementations, the UE 115 and one or more components of the BS 105 may support a signaling mechanism for BFD reporting including information associated with multiple different types of BFIs measured, detected, or reported by the UE 115.

A UE 115 may declare beam failure associated with or as a result of reporting a threshold number of BFIs from a PHY layer of the UE 115 to a MAC layer of the UE 115 and, in some systems, may be unable to report any contextual information relating to or associated with the declared beam failure to one or more components of a BS 105. For example, in scenarios in which the UE 115 declares a beam failure for a primary cell (PCell) associated with a BS 105, the UE 115 may initiate a random access procedure with one or more components of the BS 105 via a random access channel (RACH), but may be unable to transmit or convey additional information regarding the failed beam to one or more components of the BS 105. Further, in scenarios in which the UE 115 declares a beam failure for a secondary cell (SCell) associated with a BS 105, the UE 115 may transmit a beam failure recovery (BFR) request to one or more components of the BS 105 through a PCell associated with the BS 105, but may be unable to transmit or convey additional information regarding the failed beam to one or more components of the BS 105. As such, one or more components of the BS 105 may select a beam from a pool of beams without information relating to why a previous beam failed, which may potentially result in one or more components of the BS 105 selecting an unsuitable beam as a replacement beam for the UE 115.

In some implementations, a UE 115 and one or more components of a BS 105 may support a BFD reporting mechanism (for if the UE 115 declares a beam failure) according to which the UE 115 is able to report, to one or more components of the BS 105, information relating to or associated with multiple BFI types that the UE 115 is capable of identifying, determining, selecting, or detecting. For example, the UE 115 and one or more components of the BS 105 may support multiple BFI types, including a type associated with BFIs that are likely due to noise and a type associated with BFIs that are likely due to interference. Such a BFI type associated with BFIs that are likely due to noise may be referred to herein as noise-based BFIs (or BFI noise) and such a BFI type associated with BFIs that are likely due to interference may be referred to herein as interference-based BFIs (or BFI interference).

In some aspects, the UE 115 may receive, from one or more components of the BS 105 via a communication link 205, one or more control messages 215 indicating a set of control parameters associated with a transmission of a reference signal 225 from one or more components of the BS 105 or associated with measurement of the reference signal 225, or both. For example, one or more components of the BS 105 may configure, via the control messages 215, a periodicity of a reference signal 225 (if one or more components of the BS 105 transmit the reference signal 225 periodically) that one or more components of the BS 105 may transmit via a beam 220 as part of a BFD procedure and a type of the reference signal 225, such as a CSI-RS or a synchronization signal block (SSB). Further, in some implementations, one or more components of the BS 105 may configure, via the control messages 215, one or more types of BFIs, one or more measurement objects that the UE 115 may use to measure the reference signal 225, one or more procedures associated with detecting or reporting a BFI type for each BFI, one or more machine learning (ML) models associated with detecting or reporting a BFI type for each BFI, or any combination thereof.

In other words, the UE 115 may receive, from one or more components of the BS 105 via the control messages 215, an indication of the multiple types of BFI that the UE 115 may measure, detect, or report (such as BFI noise and BFI interference), one or more measurement objects (such as a signal-to-interference-plus-noise ratio (SINR), an SNR, a reference signal receive power (RSRP), a reference signal receive quality (RSRQ), an error rate, or a pathloss) that the UE 115 may use for measuring, detecting, or reporting BFIs, and a BFI algorithm associated with detection or classification of reported BFIs as one of the multiple types of BFIs. In some aspects, such a BFI algorithm may be referred to as a BFI determination algorithm and may refer to or include any computational-, procedural-, selection-, or comparison-based steps associated with classifying a reported BFI as a specific type of BFI (such as one of BFI noise or BFI interference). For example, the BFI algorithm may refer to or include one or more equations according to which the UE 115 may classify a BFI as a specific type or an ML algorithm capable of classifying one or more BFIs as specific types of BFIs. In implementations in which the UE 115 receives the control messages 215 configuring the BFI algorithm, the control messages 215 may indicate or identify the specific BFI algorithm that the UE 115 may use and indicate any parameters associated with the indicated or identified BFI algorithm.

In some implementations, one or more components of the BS 105 (a configuration entity) may configure multiple sets of values for each of the parameters indicated via the one or more control messages 215. For example, one or more components of the BS 105 may configure, at the UE 115 and via the control messages 215, multiple options for multiple types of BFI, multiple options for a periodicity associated with the reference signal 225, multiple options for measurement objects that the UE 115 may use for measurement of the reference signal 225, or multiple options for BFI algorithms associated with detection or classification of reported BFIs as one of multiple types of BFIs. In such implementations, the UE 115 may store the various options for each of the indicated parameters and one or more components of the BS 105 may indicate which of the multiple options that the UE 115 may use. For example, one or more components of the BS 105 (such as a central unit (CU), or one or more distributed units (DUs)) may configure the multiple values or options at the UE 115 via RRC signaling (via an RRC configuration) and may indicate which of the multiple values or options the UE 115 may use via downlink control information (DCI) or a MAC control element (MAC-CE). Further, in some implementations, one or more components of the BS 105 may indicate the UE 115 to switch from a first set of configuration parameters to a second set of configuration parameters via the control messages 215 (such as via DCI or a MAC-CE).

The UE 115 may use the parameters indicated via the control messages 215 to receive and measure the reference signal 225 accordingly. For example, the UE 115 may measure the reference signal 225, which may be referred to herein as a BFD-RS if used as part of a BFD procedure, in accordance with the configured periodicity and reference signal type. The UE 115 may estimate values for the one or more configured measurement objects (such as one or more of SINR, SNR, RSRP, RSRQ, error rate, or pathloss) and may measure, detect, or otherwise determine a type of a BFI in accordance with the estimated values for the configured measurement objects using one or more algorithms at the UE side.

In some implementations, for an instance or occasion of the reference signal 225, the UE 115 may measure or otherwise estimate a value of an SINR and an SNR for the reference signal 225 and may compare the SINR and the SNR to one or more thresholds to detect or otherwise determine whether a BFI associated with that instance or occasion of the reference signal 225 is a noise-based BFI or an interference-based BFI. For example, if the UE 115 measures that the SINR is less than an SINR threshold (SINR<SINR_threshold) and the SNR is greater than an SNR threshold (SNR>SNR_threshold), the UE 115 may detect or otherwise determine that the BFI associated with that instance or occasion of the reference signal 225 is an interference-based BFI. Otherwise, the UE 115 may detect or otherwise determine that the BFI associated with that instance or occasion of the reference signal 225 is a noise-based BFI.

The UE 115 may measure one or more additional instances or occasions of the reference signal 225 and may declare a beam failure for the beam 220 if a quantity of measured or reported BFIs satisfies a threshold BFI count prior to expiration of a BFD timer. The UE 115 may account, track, or otherwise store information relating to which of the quantity of measured or reported BFIs are interference-based BFIs and which of the measured or reported BFIs are noise-based BFIs over time (such as across multiple TTIs corresponding to multiple BFD-RS monitoring occasions). For example, as the UE 115 detects or reports BFIs associated with the reference signal 225 and the beam 220, the UE 115 may, in some implementations, increment separate BFI counts for each BFI type. In such implementations, the UE 115 may increment a first counter associated with the interference-based BFI type for each detected interference-based BFI, may increment a second counter associated with the noise-based BFI type for each detected noise-based BFI, may increment a total BFI counter associated with all BFI types, or any combination thereof.

Additionally, or alternatively, the UE 115 may monitor for consecutive BFIs associated with a given type and may store a maximum or longest detected set of consecutive BFIs associated with the given type. For example, the UE 115 may detect a set of consecutive interference-based BFIs (such as a maximum or longest detected set of consecutive interference-based BFIs) and a set of consecutive noise-based BFIs (such as a maximum or longest detected set of consecutive noise-based BFIs) and may store the sets of consecutive BFIs for each type of BFI. Additionally, or alternatively, the UE 115 may store a pattern or complete history of reported BFIs including information associated with which of all reported BFIs are interference-based BFIs and which of all reported BFIs are noise-based BFIs.

In some implementations, and in accordance with declaring the beam failure for the beam 220, the UE 115 may transmit a report 230 to one or more components of the BS 105 via a communication link 210. In some aspects, the communication link 210 may be associated with a configuration for directional communication (such as a beam pair link) that is still available (in other words, is not associated with a beam failure). The UE 115 may include, in the report 230, the information associated with the number of interference-based BFIs and the number of noise-based BFIs that the UE 115 detects over the time duration associated with the declared beam failure.

For example, the UE 115 may include the BFI counts (such as a status of the counters maintained at the UE 115) in the report 230. In such examples, the UE 115 may include a count associated with the total BFI counter associated with all BFI types and some additional information associated with a relative amount of each different type of BFI. In some implementations, the UE 115 may include a first count associated with the first counter for the interference-based BFI type and a second count associated with the second counter for the noise-based BFI type. Additionally, or alternatively, the UE 115 may include a percentage or ratio of each BFI type relative to the total BFI counts. For example, the UE 115 may include a percentage of the number of interference-based BFIs relative to the total number of BFIs detected or reported by the UE 115 or a percentage of the number of noise-based BFIs relative to the total number of BFIs detected or reported by the UE 115, or both. Additionally, or alternatively, the UE 115 may include, in the report 230, a percentage or ratio of interference-based BFIs relative to noise-based BFIs. In such examples in which the UE 115 reports information associated with the relative amounts of each different type of BFI, one or more components of the BS 105 may utilize the BFI count information to obtain, ascertain, identify, or otherwise determine information associated with a reason for beam failure or overall channel conditions at the UE 115.

The UE 115 may additionally, or alternatively, include information relating to BFI patterns in the report 230 that the UE 115 transmits to one or more components of the BS 105. For example, the UE 115 may include a maximum or longest number of detected consecutive BFI counts for each type of BFI. In such examples, the UE 115 may include information associated with a first (maximum or longest) set of consecutive BFIs associated with the interference-based BFI type or a second (maximum or longest) set of consecutive BFIs associated with the noise-based BFI type, or both. In some aspects, the UE 115 may report the information associated with the first set of consecutive BFIs via a first number (corresponding to a length of the first set of consecutive BFIs) and may report the information associated with the second set of consecutive BFIs via a second number (corresponding to a length of the second set of consecutive BFIs).

Additionally, or alternatively, the UE 115 may include information associated with the complete history of BFI reports for each type of BFI in the report 230. In such examples in which the UE 115 reports the complete history of BFI reports for each type of BFI report, the UE 115 may indicate, via the report 230, the reported BFIs, which of the reported BFIs are interference-based BFIs, and which of the reported BFIs are noise-based BFIs. In some aspects, the UE 115 may further include timing information associated with each reported BFI (such as for which instance or occasion of the reference signal 225 that BFI was reported). In such examples in which the UE 115 reports information associated with the BFI patterns, one or more components of the BS 105 may utilize the BFI count information to obtain, ascertain, identify, or otherwise determine information associated with a reason for beam failure.

The UE 115 may receive, from one or more components of the BS 105, a configuration (such as an RRC configuration) for the reporting of the additional information (the information associated with the multiple types of BFIs) in the report 230. For example, one or more components of the BS 105 may configure any combination of reporting options from the UE 115 and the UE 115 may include the information associated with the multiple BFI types in accordance with the reporting option configured by one or more components of the BS 105. In some aspects, one or more components of the BS 105 may configure the reporting option at the UE 115 via the one or more control messages 215.

In some implementations, the BS 105 may configure multiple different combinations of reporting options at the UE 115 (such as via an RRC configuration associated with or carried by the one or more control messages 215) and may indicate which of the multiple reporting options the UE 115 may use for generating and transmitting the report 230 (via others of the one or more control messages 215). Such indicated one or more reporting options may be referred to herein as a reporting configuration. As such, one or more components of the BS 105 may indicate which reporting configuration the UE 115 may use or may indicate or otherwise configure the UE 115 to switch from using a first reporting configuration to using a second reporting configuration via at least one of the control messages 215. In accordance with the configuration from one or more components of the BS 105 via the control messages 215, and in examples in which the UE 115 is configured to switch between reporting configurations, the UE 115 may switch between reporting configurations periodically or aperiodically (such as upon request). In some aspects, one or more components of the BS 105 may transmit the indication of the reporting configuration or the indication to switch reporting configurations via DCI or a MAC-CE.

Further, in some implementations, the UE 115 and one or more components of the BS 105 may support various additional signaling mechanisms or designs for activation or deactivation of the detection or classification of multiple BFI types or activation or deactivation of the reporting mechanism for providing the information associated with the multiple BFI types, or both. In some aspects, such activation and deactivation signaling may enable or configure the UE 115 to switch between different BFI detection or reporting techniques (such as between tracking multiple BFI types and tracking a single BFI type) or to switch between different BFD reporting techniques (such as between reporting information related to multiple BFI types and reporting information related to a single BFI type). Such signaling mechanisms are illustrated by and described in more detail with reference to FIG. 3.

As such, the UE 115 and one or more components of the BS 105 may support an exchanging of information associated with multiple types of BFI reported or detected by the UE 115 as well as various signaling mechanisms for configuring, adapting, updating, activating, or deactivating such an exchanging of information associated with the multiple types of BFI. In some aspects, one or more components of the BS 105 may use such information to select a new beam (such as a replacement beam) to use for directional communication to the UE 115, which may provide higher reliability and reduce the likelihood for future beam failures at the UE 115.

Figure 3:
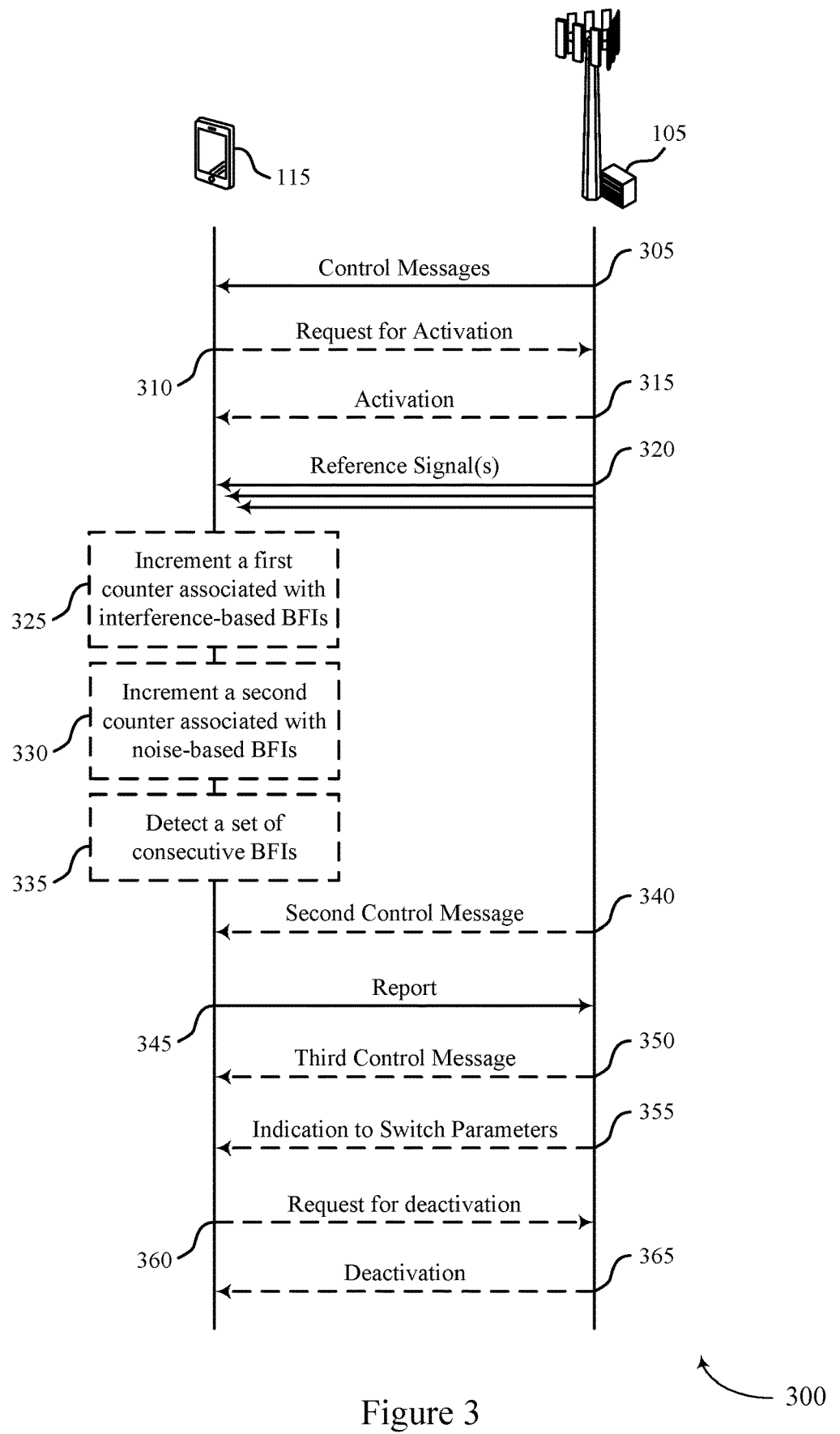
FIG. 3 illustrates an example process flow that supports beam failure declaration and reporting.

FIG. 3 illustrates an example process flow 300 that supports beam failure declaration and reporting. The process flow 300 may implement or be implemented to realize aspects of the wireless communications system 100 or the signaling diagram 200. For example, the process flow 300 illustrates communication between a UE 115 and one or more components of a BS 105. The UE 115 of FIG. 3 may be an example of a UE 115 as illustrated by and described with reference to FIG. 1 or 2. The one or more components of the BS 105 of FIG. 3 may be examples of one or more components of a BS 105 as illustrated by and described with reference to FIG. 1 or 2. In some aspects, the one or more components of the BS 105 may be individually or collectively referred to as a network entity. In some implementations, the UE 115 and one or more components of the BS 105 may support signaling mechanisms for conveying information associated with multiple different types of BFIs detected or reported by the UE 115.

In the following description of the process flow 300, the operations may be performed (such as reported or provided) in a different order than the order shown, or the operations performed by the example devices may be performed in different orders or at different times. Some operations also may be omitted from the process flow 300, or other operations may be added to the process flow 300. Further, although some operations or signaling may be shown to occur at different times for discussion purposes, these operations may actually occur at the same time or otherwise concurrently.

At 305, the UE 115 may receive, from one or more components of the BS 105, a set of control messages indicating a set of one or more parameters associated with measurement, by the UE 115, of one or more reference signals. In some aspects, the UE 115 may receive the set of control messages via any one or more of RRC signaling, a MAC-CE, or DCI. In some implementations, the set of parameters may include a first set of parameters associated with a configuration of the one or more reference signals and a second set of parameters associated with a configuration of BFI criteria and classification of reported BFIs as different BFI types in accordance with the measurement of the one or more reference signals. For example, the first set of parameters may include or indicate a reference signal type associated with the one or more reference signals or a periodicity associated with the one or more reference signals, or both.

The second set of parameters may include or indicate one or more types of BFIs, one or more measurement objects for measurement by the UE 115, one or more procedures associated with detecting or classifying a BFI type for each reported BFI, one or more ML models or algorithms associated with detecting or classifying a BFI type for each reported BFI, or any combination thereof. In some aspects, each of the one or more measurement objects may correspond to a respective type of BFI. For example, the UE 115 may use one or more of an SINR measurement, an SNR measurement, an RSRP measurement, an RSRQ measurement, an error rate measurement, or a pathloss measurement to detect or classify BFIs as different types of BFI. In some aspects, the different types of BFI may include an interference-based BFI and a noise-based BFI. Additionally, or alternatively, the control messages may indicate a reporting configuration associated with a BFD at the UE 115 and for reporting information relating to a number of interference-based BFIs and a number of noise-based BFIs detected by the UE 115.

At 310, the UE 115 may transmit, to one or more components of the BS 105, a request to activate the measurement of the one or more reference signals in accordance with the set of parameters (such as in accordance with the second set of parameters associated with configuration of BFI criteria and classification of reported BFIs as different BFI types) or to activate reporting of the information relating to the number of interference-based BFIs and the number of noise-based BFIs. In some implementations, the UE 115 may request to activate such one or more functions in accordance with a UE capability. The UE 115 may transmit the request for activation via uplink control information (UCI) or a MAC-CE.

At 315, the UE 115 may receive, from one or more components of the BS 105, an indication to activate the measurement of the one or more reference signals in accordance with the set of parameters (such as in accordance with the second set of parameters associated with configuration of BFI criteria and classification of reported BFIs as different BFI types) or to activate reporting of the information relating to the number of interference-based BFIs and the number of noise-based BFIs. In some implementations, one or more components of the BS 105 may transmit the activation of such one or more functions at 315 associated with or responsive to receiving the request for activation from the UE 115 at 310, associated with a capability of the UE 115, or associated with a capability of one or more components of the BS 105. One or more components of the BS 105 may transmit the activation to the UE 115 via DCI or a MAC-CE.

At 320, the UE 115 may receive, from one or more components of the BS 105, the one or more reference signals in accordance with the set of parameters. For example, the UE 115 may receive the one or more reference signals in accordance with the first set of parameters associated with the configuration of the one or more reference signals. The one or more reference signals may include CSI-RSs or SSBs and may be periodic. In aspects in which the UE 115 receives and measures the reference signals as part of a BFD procedure, the reference signals may be referred to as BFD-RSs. In examples in which the reference signals are periodic, the UE 115 may receive different instances of the same reference signal (such as a same reference signal type transmitted from one or more components of the BS 105 using a same beam) and may measure the different instances of the reference signal in accordance with the one or more measurement objects. As such, the UE 115 may monitor or track information relating to a number of BFIs associated with the reference signal (or the beam used to transmit the reference signal) and information relating to which of the number of BFIs are interference-based BFIs and which of the number of BFIs are noise-based BFIs.

At 325, for example, the UE 115 may increment a first counter associated with interference-based BFIs in accordance with a set of one or more identified interference-based BFIs. In some implementations, the UE 115 may detect, classify, or otherwise identify interference-based BFIs in accordance with the measurement of the one or more reference signals.

At 330, the UE 115 may increment a second counter associated with noise-based BFIs in accordance with a set of one or more identified noise-based BFIs. In some implementations, the UE 115 may detect, classify, or otherwise identify noise-based BFIs in accordance with the measurement of the one or more reference signals.

At 335, the UE 115 may detect a set (or multiple sets) of consecutive BFIs over a set of BFD-RS occasions in accordance with the measurement of the one or more reference signals. The set of BFD-RS occasions may correspond to or may be otherwise associated with a frequency according to which one or more components of the BS 105 transmit the one or more reference signals (such as the one or more BFD-RSs). As such, if the UE 115 identifies, detects, or otherwise determines a BFI for consecutive BFD-RS occasions, the BFI or BFIs for the consecutive BFD-RS occasions may be referred to as consecutive BFIs. In some aspects, a BFD-RS occasion may include or be associated with a TTI and the UE 115 may detect consecutive BFIs if a BFI is reported during TTIs associated with consecutive BFD-RS occasions. In some implementations, the set of consecutive BFIs may include or otherwise be associated with a set of consecutive interference-based BFIs or a set of consecutive noise-based BFIs, or both. For example, the UE 115 may detect a first set of consecutive interference-based BFIs and a second set of consecutive noise-based BFIs. In some aspects, the respective sets of consecutive interference-based BFIs and noise-based BFIs may each refer to a maximum or longest set of consecutive BFIs for each BFI type.

Further, although 320, 325, 330, and 335 are shown as occurring one after another or at different times, the UE 115 may perform the operations associated with 320, 325, 330, and 335 concurrently. For example, the UE 115 may increment the first counter, increment the second counter, or detect set(s) of consecutive BFIs, or any combination thereof, while simultaneously receiving the one or more reference signals from one or more components of the BS 105.

At 340, the UE 115 may receive, from one or more components of the BS 105, a second control message indicating a reporting configuration for reporting the information relating to the number of interference-based BFIs and the number of noise-based BFIs. In some aspects, the UE 115 may receive the second control signal via one or more of RRC signaling, a MAC-CE, or DCI. Further, although shown as occurring after transmission of the one or more reference signals, the UE 115 may receive the second control message indicating the reporting configuration prior to the transmission of the one or more reference signals. For example, the UE 115 may receive the second control message along with receiving the set of control messages at 305.

At 345, the UE 115 may transmit, to one or more components of the BS 105, a report including information related to the number of interference-based BFIs and the number of noise-based BFIs. In some implementations, the information may include a number of detected interference-based BFIs. Additionally, or alternatively, the information may include a number of detected noise-based BFIs. Additionally, or alternatively, the information may include a percentage of the number of detected interference-based BFIs relative to a total number of BFIs detected or reported. Additionally, or alternatively, the information may include a percentage of the number of detected noise-based BFIs relative to a total number of BFIs detected or reported.

Additionally, or alternatively, the information may include a ratio of the number of detected interference-based BFIs relative to the number of detected noise-based BFIs. Additionally, or alternatively, the information may include an indication of a pattern associated with the number of interference-based BFIs, the number of noise-based BFIs, or both. Additionally, or alternatively, the information may include an indication of the one or more detected sets of consecutive BFIs. Additionally, or alternatively, the information may include an indication of a report history (such as a complete history) for each of the number of interference-based BFIs and the number of noise-based BFIs. In some aspects, the UE 115 may transmit the report in accordance with or as a result of declaring a beam failure for a beam with which one or more components of the BS 105 transmit the one or more reference signals and, in such aspects, the UE 115 may transmit the report as a BFD report. The UE 115 may declare beam failure if a total BFI count (including all of the multiple types of BFIs) satisfies a threshold or if any one or more of BFI counts for specific types of BFIs satisfies a threshold. In some aspects, the UE 115 may transmit the BFD via a BFR MAC-CE.

At 350, the UE 115 may receive, from one or more components of the BS 105, a third control message indicating a switch from one reporting configuration to another reporting configuration. For example, one or more components of the BS 105 may signal a change from a first reporting configuration (associated with reporting first information related to the number of interference-based BFIs and the number of noise-based BFIs) to a second reporting configuration (associated with reporting second information related to the number of interference-based BFIs and the number of noise-based BFIs) and the UE 115 may update generation of the BFD report accordingly. In some aspects, the UE 115 may receive the third control message indicating the switch from one reporting configuration to another reporting configuration via a MAC-CE or DCI.

At 355, the UE 115 may receive, from one or more components of the BS 105, an indication to switch from the set of parameters to a second set of parameters associated with detecting a BFI type for each BFI associated with the measurement of the one or more reference signals. For example, the UE 115 may receive an indication to switch from using an "if-else" operation for detecting or classifying different BFI types to using an ML model or algorithm for detecting or classifying different BFI types. In some aspects, the UE 115 may receive the indication to switch from the set of parameters to a second set of parameters associated with detecting a BFI type via a MAC-CE or DCI.

At 360, the UE 115 may transmit, to one or more components of the BS 105, a request to deactivate the measurement of the one or more reference signals in accordance with the set of parameters (such as in accordance with the second set of parameters associated with configuration of BFI criteria and classification of reported BFIs as different BFI types) or to deactivate reporting of the information relating to the number of interference-based BFIs and the number of noise-based BFIs. In some implementations, the UE 115 may request to deactivate such one or more functions in accordance with a UE capability. The UE 115 may transmit the request for deactivation via UCI or a MAC-CE.

At 365, the UE 115 may receive, from one or more components of the BS 105, an indication to deactivate the measurement of the one or more reference signals in accordance with the set of parameters (such as in accordance with the second set of parameters associated with configuration of BFI criteria and classification of reported BFIs as different BFI types) or to deactivate reporting of the information relating to the number of interference-based BFIs and the number of noise-based BFIs. In some implementations, one or more components of the BS 105 may transmit the deactivation of such one or more functions at 365 associated with or responsive to receiving the request for deactivation from the UE 115 at 360, associated with a capability of the UE 115, or associated with a capability of one or more components of the BS 105. One or more components of the BS 105 may transmit the deactivation to the UE 115 via DCI or a MAC-CE.

Figure 4:
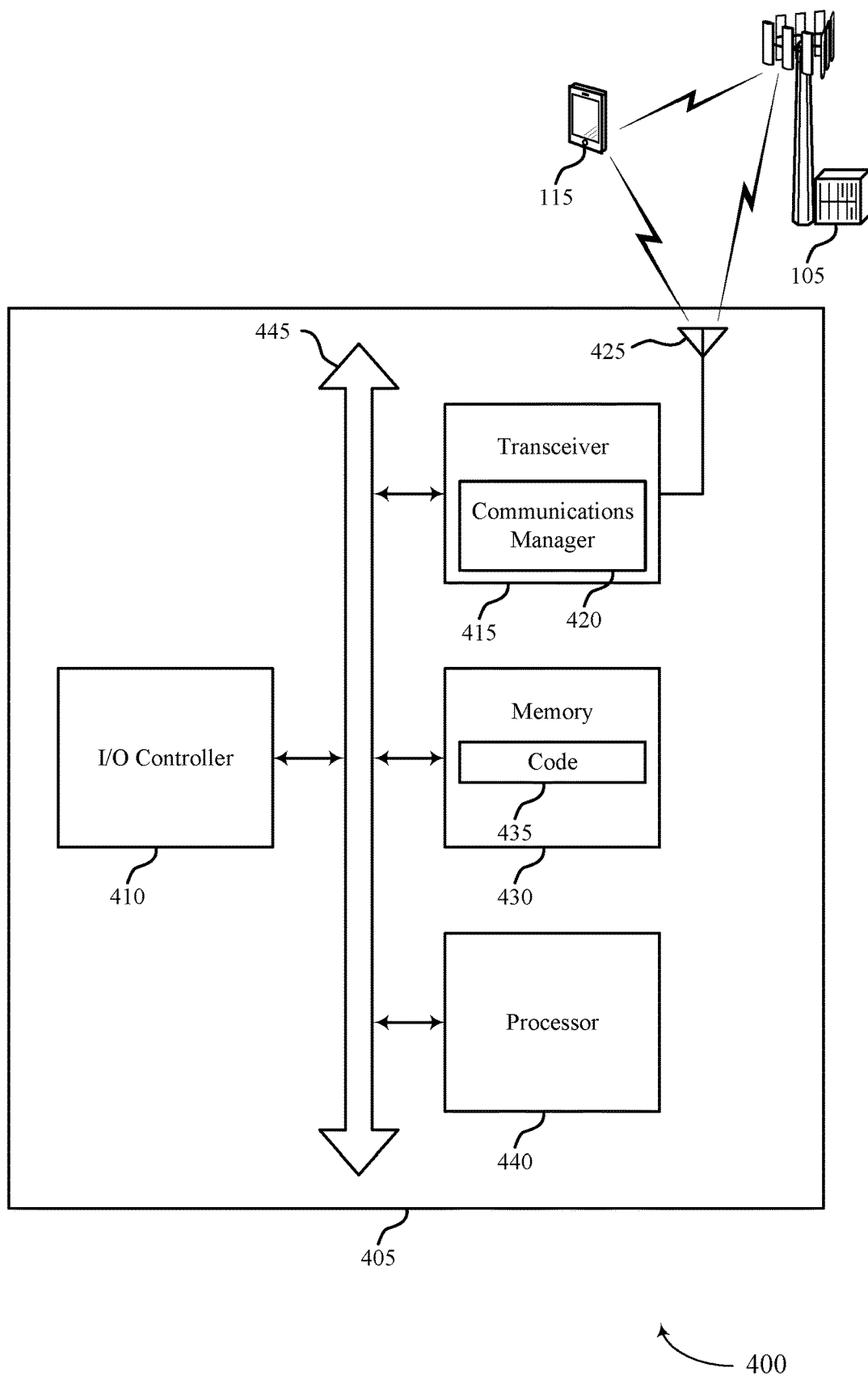
FIGS. 4 and 5 illustrate block diagrams of example devices that support beam failure declaration and reporting.

FIG. 4 shows a block diagram 400 of an example device 405 that supports beam failure declaration and reporting. The device 405 may communicate wirelessly with one or more BSs 105, UEs 115, or any combination thereof. The device 405 may include components for bi-directional voice and data communications including components for transmitting and receiving communications, such as a communications manager 420, an input/output (I/O) controller 410, a transceiver 415, an antenna 425, a memory 430, code 435, and a processor 440. These components may be in electronic communication or otherwise coupled (such as operatively, communicatively, functionally, electronically, electrically) via one or more buses (such as a bus 445).

The I/O controller 410 may manage input and output signals for the device 405. The I/O controller 410 also may manage peripherals not integrated into the device 405. In some implementations, the I/O controller 410 may represent a physical connection or port to an external peripheral. In some implementations, the I/O controller 410 may utilize an operating system such as iOS®, ANDROID®, MS-DOS®, MS-WINDOWS®, OS/2®, UNIX®, LINUX®, or another known operating system. Additionally, or alternatively, the I/O controller 410 may represent or interact with a modem, a keyboard, a mouse, a touchscreen, or a similar device. In some implementations, the I/O controller 410 may be implemented as part of a processor or processing system, such as the processor 440. In some implementations, a user may interact with the device 405 via the I/O controller 410 or via hardware components controlled by the I/O controller 410.

In some implementations, the device 405 may include a single antenna 425. However, in some other implementations, the device 405 may have more than one antenna 425, which may be capable of concurrently transmitting or receiving multiple wireless transmissions. The transceiver 415 may communicate bi-directionally, via the one or more antennas 425, wired, or wireless links as described herein. For example, the transceiver 415 may represent a wireless transceiver and may communicate bi-directionally with another wireless transceiver. The transceiver 415 also may include a modem to modulate the packets, to provide the modulated packets to one or more antennas 425 for transmission, and to demodulate packets received from the one or more antennas 425.

In some implementations, the transceiver 415 may include one or more interfaces, such as one or more interfaces coupled with the one or more antennas 425 that are configured to support various receiving or obtaining operations, or one or more interfaces coupled with the one or more antennas 425 that are configured to support various transmitting or outputting operations, or a combination thereof. In some implementations, the transceiver 415 may include or be configured for coupling with one or more processors or memory components that are operable to perform or support operations associated with received or obtained information or signals, or to generate information or other signals for transmission or other outputting, or any combination thereof. In some implementations, the transceiver 415, or the transceiver 415 and the one or more antennas 425, or the transceiver 415 and the one or more antennas 425 and one or more processors or memory components (for example, the processor 440, or the memory 430, or both), may be included in a chip or chip assembly that is installed in the device 405.

The memory 430 may include random access memory (RAM) and read-only memory (ROM). The memory 430 may store computer-readable, computer-executable code 435 including instructions that, when executed by the processor 440, cause the device 405 to perform various functions described herein. The code 435 may be stored in a non-transitory computer-readable medium such as system memory or another type of memory. In some implementations, the code 435 may not be directly executable by the processor 440 but may cause a computer (for example, when compiled and executed) to perform functions described herein. In some implementations, the memory 430 may contain, among other things, a basic I/O system (BIOS) which may control basic hardware or software operation such as the interaction with peripheral components or devices.

The processor 440 may be any one or more suitable processors capable of executing scripts or instructions of one or more software programs stored in the device 405 (such as within the memory 430). In some implementations, the processor 440 may be a component of a processing system. A processing system may generally refer to a system or series of machines or components that receives inputs and processes the inputs to produce a set of outputs (which may be passed to other systems or components of, for example, the device 405). For example, a processing system of the device 405 may refer to a system including the various other components or subcomponents of the device 405, such as the processor 440, or the transceiver 415, or the communications manager 420, or other components or combinations of components of the device 405.

The processing system of the device 405 may interface with other components of the device 405, and may process information received from other components (such as inputs or signals) or output information to other components. For example, a chip or modem of the device 405 may include a processing system, a first interface to output information, and a second interface to obtain information. In some implementations, the first interface may refer to an interface between the processing system of the chip or modem and a transmitter, such that the device 405 may transmit information output from the chip or modem. In some implementations, the second interface may refer to an interface between the processing system of the chip or modem and a receiver, such that the device 405 may obtain information or signal inputs, and the information may be passed to the processing system. A person having ordinary skill in the art will readily recognize that the first interface also may obtain information or signal inputs, and the second interface also may output information or signal outputs.

The communications manager 420 may support wireless communications at a UE in accordance with examples as disclosed herein. For example, the communications manager 420 may be configured as or otherwise support a means for receiving, from a network entity, a set of one or more control messages indicating a set of one or more parameters associated with measurement, by the UE, of one or more reference signals. The communications manager 420 may be configured as or otherwise support a means for receiving the one or more reference signals in accordance with the set of one or more parameters. The communications manager 420 may be configured as or otherwise support a means for transmitting, to the network entity, a report including information related to a number of interference-based BFIs and a number of noise-based BFIs associated with the measurement of the one or more reference signals according to the set of one or more parameters.

In some implementations, the communications manager 420 may be configured as or otherwise support a means for incrementing a first counter associated with interference-based BFIs based on a set of one or more identified interference-based BFIs associated with the measurement of the one or more reference signals, where the number of interference-based BFIs is included in the report based on the first counter.

In some implementations, the communications manager 420 may be configured as or otherwise support a means for incrementing a second counter associated with noise-based BFIs based on a set of one or more identified noise-based BFIs associated with the measurement of the one or more reference signals, where the number of noise-based BFIs is included in the report based on the second counter.

In some implementations, to support transmitting the report, the communications manager 420 may be configured as or otherwise support a means for transmitting, in the report, an indication of a percentage of the number of interference-based BFIs or the number of noise-based BFIs relative to a total number of BFIs detected by the UE.

In some implementations, to support transmitting the report, the communications manager 420 may be configured as or otherwise support a means for transmitting, in the report, an indication of a pattern associated with the number of interference-based BFIs, the number of noise-based BFIs, or both.

In some implementations, the communications manager 420 may be configured as or otherwise support a means for detecting a set of consecutive BFIs over a set of transmission time intervals based on the measurement of the one or more reference signals, the set of consecutive BFIs associated with one of the number of interference-based BFIs or the number of noise-based BFIs, where an indication of the set of consecutive BFIs is included in the report.

In some implementations, the communications manager 420 may be configured as or otherwise support a means for detecting the number of interference-based BFIs, the number of noise-based BFIs, or both based on an ML model for BFD, where the ML model is indicated based on the set of one or more parameters.

In some implementations, to support transmitting the report, the communications manager 420 may be configured as or otherwise support a means for transmitting, in the report, an indication of a report history for each of the number of interference-based BFIs and the number of noise-based BFIs.

In some implementations, the communications manager 420 may be configured as or otherwise support a means for receiving a second control message indicating a reporting configuration for reporting the information, where the report is transmitted in accordance with the reporting configuration.

In some implementations, the communications manager 420 may be configured as or otherwise support a means for receiving a third control message indicating a switch from a second reporting configuration to the reporting configuration.

In some implementations, the communications manager 420 may be configured as or otherwise support a means for receiving, from the network entity, an indication to activate or deactivate the measurement of the one or more reference signals in accordance with the set of one or more parameters.

In some implementations, the communications manager 420 may be configured as or otherwise support a means for receiving, from the network entity, an indication to activate or deactivate reporting of the information related to the number of interference-based BFIs and the number of noise-based BFIs.

In some implementations, the communications manager 420 may be configured as or otherwise support a means for transmitting, based on a capability of the UE, a request to activate the measurement of the one or more reference signals in accordance with the set of one or more parameters or activate reporting of the information related to the number of interference-based BFIs and the number of noise-based BFIs.

In some implementations, the communications manager 420 may be configured as or otherwise support a means for receiving, from the network entity, an indication to switch from the set of one or more parameters to a second set of one or more parameters associated with a BFI type for each BFI associated with the measurement of the one or more reference signals by the UE.

In some implementations, the set of one or more parameters may include a first set of parameters including a reference signal type associated with the one or more reference signals, a periodicity associated with the one or more reference signals, or a combination thereof. In some implementations, the set of one or more parameters may include a second set of parameters including one or more types of BFIs, one or more measurement objects for measurement by the UE, one or more procedures associated with a BFI type for each BFI, one or more ML models associated with the BFI type for each BFI, or a combination thereof. In some implementations, each of the one or more measurement objects corresponds to a respective type of the one or more types of BFIs.

In some implementations, the communications manager 420 may be configured to perform various operations (for example, receiving, monitoring, transmitting) using or otherwise in cooperation with the transceiver 415, the one or more antennas 425, or any combination thereof. Although the communications manager 420 is illustrated as a separate component, in some implementations, one or more functions described with reference to the communications manager 420 may be supported by or performed by the processor 440, the memory 430, the code 435, or any combination thereof. For example, the code 435 may include instructions executable by the processor 440 to cause the device 405 to perform various aspects of beam failure declaration and reporting as described herein, or the processor 440 and the memory 430 may be otherwise configured to perform or support such operations.

Figure 5:
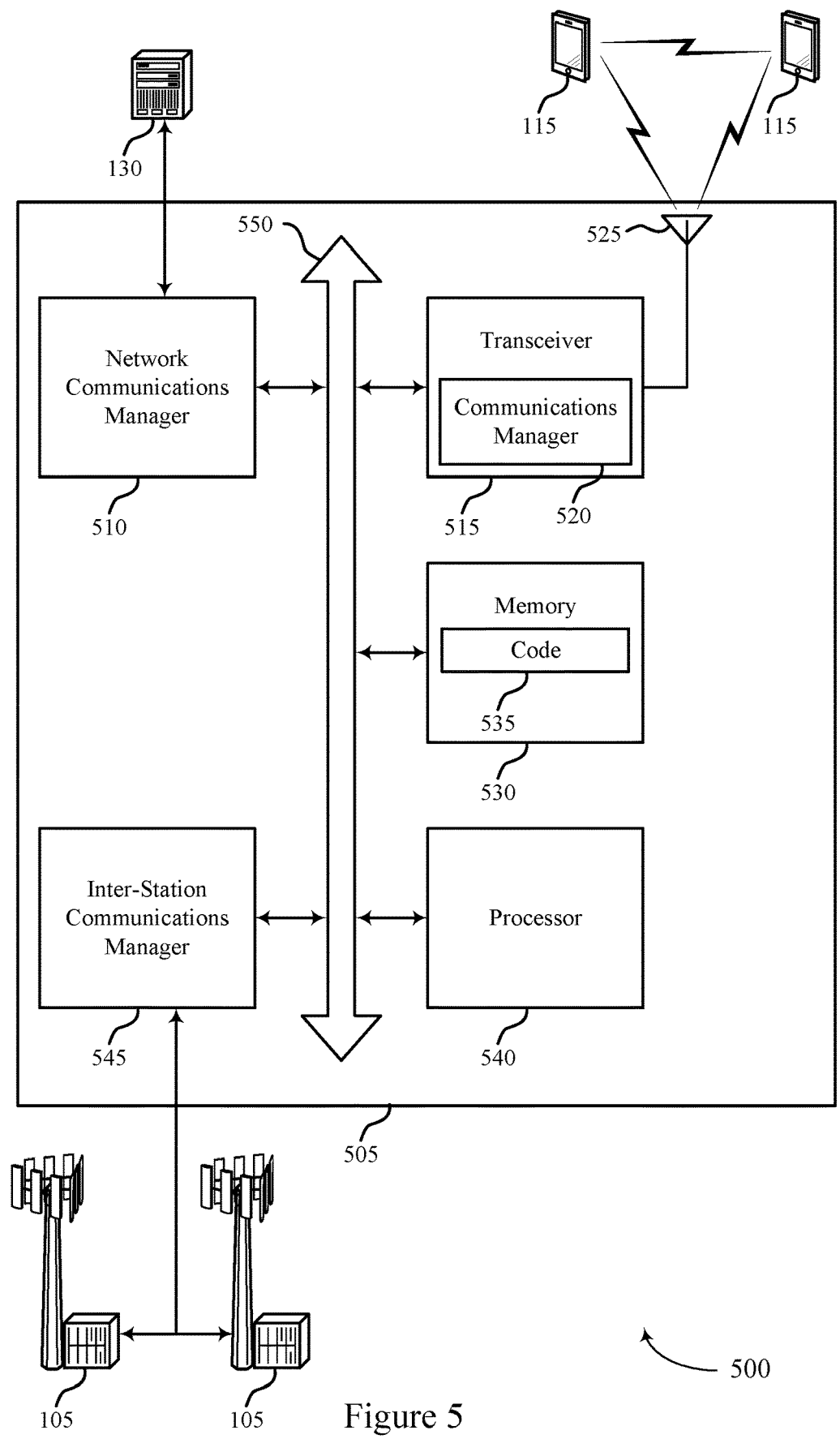

FIG. 5 shows a block diagram 500 of an example device 505 that supports beam failure declaration and reporting. The device 505 may communicate wirelessly with one or more BSs 105, UEs 115, or any combination thereof. The device 505 may include components for bi-directional voice and data communications including components for transmitting and receiving communications, such as a communications manager 520, a network communications manager 510, a transceiver 515, an antenna 525, a memory 530, code 535, a processor 540, and an inter-station communications manager 545. These components may be in electronic communication or otherwise coupled (such as operatively, communicatively, functionally, electronically, electrically) via one or more buses (such as a bus 550).

The network communications manager 510 may manage communications with a core network 130 (for example, via one or more wired backhaul links). For example, the network communications manager 510 may manage the transfer of data communications for client devices, such as one or more UEs 115.

In some implementations, the device 505 may include a single antenna 525. However, in some other implementations, the device 505 may have more than one antenna 525, which may be capable of concurrently transmitting or receiving multiple wireless transmissions. The transceiver 515 may communicate bi-directionally, via the one or more antennas 525, wired, or wireless links as described herein. For example, the transceiver 515 may represent a wireless transceiver and may communicate bi-directionally with another wireless transceiver. The transceiver 515 also may include a modem to modulate the packets, to provide the modulated packets to one or more antennas 525 for transmission, and to demodulate packets received from the one or more antennas 525.

In some implementations, the transceiver 515 may include one or more interfaces, such as one or more interfaces coupled with the one or more antennas 525 that are configured to support various receiving or obtaining operations, or one or more interfaces coupled with the one or more antennas 525 that are configured to support various transmitting or outputting operations, or a combination thereof. In some implementations, the transceiver 515 may include or be configured for coupling with one or more processors or memory components that are operable to perform or support operations based on received or obtained information or signals, or to generate information or other signals for transmission or other outputting, or any combination thereof. In some implementations, the transceiver 515, or the transceiver 515 and the one or more antennas 525, or the transceiver 515 and the one or more antennas 525 and one or more processors or memory components (for example, the processor 540, or the memory 530, or both), may be included in a chip or chip assembly that is installed in the device 505.

The memory 530 may include RAM and ROM. The memory 530 may store computer-readable, computer-executable code 535 including instructions that, when executed by the processor 540, cause the device 505 to perform various functions described herein. The code 535 may be stored in a non-transitory computer-readable medium such as system memory or another type of memory. In some implementations, the code 535 may not be directly executable by the processor 540 but may cause a computer (for example, when compiled and executed) to perform functions described herein. In some implementations, the memory 530 may contain, among other things, a BIOS which may control basic hardware or software operation such as the interaction with peripheral components or devices.

The processor 540 may be any one or more suitable processors capable of executing scripts or instructions of one or more software programs stored in the device 505 (such as within the memory 530). In some implementations, the processor 540 may be a component of a processing system. A processing system may generally refer to a system or series of machines or components that receives inputs and processes the inputs to produce a set of outputs (which may be passed to other systems or components of, for example, the device 505). For example, a processing system of the device 505 may refer to a system including the various other components or subcomponents of the device 505, such as the processor 540, or the transceiver 515, or the communications manager 520, or other components or combinations of components of the device 505.

The processing system of the device 505 may interface with other components of the device 505, and may process information received from other components (such as inputs or signals) or output information to other components. For example, a chip or modem of the device 505 may include a processing system, a first interface to output information, and a second interface to obtain information. In some implementations, the first interface may refer to an interface between the processing system of the chip or modem and a transmitter, such that the device 505 may transmit information output from the chip or modem. In some implementations, the second interface may refer to an interface between the processing system of the chip or modem and a receiver, such that the device 505 may obtain information or signal inputs, and the information may be passed to the processing system. A person having ordinary skill in the art will readily recognize that the first interface also may obtain information or signal inputs, and the second interface also may output information or signal outputs.

The inter-station communications manager 545 may manage communications with other BSs 105, and may include a controller or scheduler for controlling communications with UEs 115 in cooperation with other BSs 105. For example, the inter-station communications manager 545 may coordinate scheduling for transmissions to UEs 115 for various interference mitigation techniques such as beamforming or joint transmission. In some implementations, the inter-station communications manager 545 may provide an X2 interface within an LTE/LTE-A wireless communications network technology to provide communication between BSs 105.

The communications manager 520 may support wireless communications at a network entity in accordance with examples as disclosed herein. For example, the communications manager 520 may be configured as or otherwise support a means for transmitting, to a UE, a set of one or more control messages indicating a set of one or more parameters associated with measurement, by the UE, of one or more reference signals. The communications manager 520 may be configured as or otherwise support a means for transmitting the one or more reference signals in accordance with the set of one or more parameters. The communications manager 520 may be configured as or otherwise support a means for receiving, from the UE, a report including information related to a number of interference-based BFIs and a number of noise-based BFIs associated with the measurement of the one or more reference signals according to the set of one or more parameters.

In some implementations, to support receiving the report, the communications manager 520 may be configured as or otherwise support a means for receiving, in the report, an indication of a percentage of the number of interference-based BFIs or the number of noise-based BFIs relative to a total number of BFIs detected by the UE.

In some implementations, to support receiving the report, the communications manager 520 may be configured as or otherwise support a means for receiving, in the report, an indication of a pattern associated with the number of interference-based BFIs, the number of noise-based BFIs, or both.

In some implementations, to support receiving the report, the communications manager 520 may be configured as or otherwise support a means for receiving, in the report, an indication of a set of consecutive BFIs over a set of transmission time intervals detected by the UE, the set of consecutive BFIs associated with one of the number of interference-based BFIs or the number of noise-based BFIs.

In some implementations, to support receiving the report, the communications manager 520 may be configured as or otherwise support a means for receiving, in the report, an indication of a report history for each of the number of interference-based BFIs and the number of noise-based BFIs.

In some implementations, the communications manager 520 may be configured as or otherwise support a means for transmitting, to the UE, a second control message indicating a reporting configuration for reporting the information, where the report is received in accordance with the reporting configuration.

In some implementations, the communications manager 520 may be configured as or otherwise support a means for transmitting, to the UE, a third control message indicating a switch from a second reporting configuration to the reporting configuration.

In some implementations, the communications manager 520 may be configured as or otherwise support a means for transmitting, to the UE, an indication to activate or deactivate the measurement of the one or more reference signals in accordance with the set of one or more parameters.

In some implementations, the communications manager 520 may be configured as or otherwise support a means for receiving, based on a capability of the UE, a request to activate the measurement of the one or more reference signals in accordance with the set of one or more parameters or activate reporting of the information related to the number of interference-based BFIs and the number of noise-based BFIs.

In some implementations, the communications manager 520 may be configured as or otherwise support a means for transmitting, to the UE, an indication to switch from the set of one or more parameters to a second set of one or more parameters associated with a BFI type for each BFI associated with the measurement of the one or more reference signals by the UE.

In some implementations, the set of one or more parameters may include a first set of parameters including a reference signal type associated with the one or more reference signals, a periodicity associated with the one or more reference signals, or a combination thereof. In some implementations, the set of one or more parameters may include a second set of parameters including one or more types of BFIs, one or more measurement objects for measurement by the UE, one or more procedures associated with a BFI type for each BFI, one or more ML models associated with the BFI type for each BFI, or a combination thereof. In some implementations, each of the one or more measurement objects corresponds to a respective type of the one or more types of BFIs.

In some implementations, the communications manager 520 may be configured to perform various operations (for example, receiving, monitoring, transmitting) using or otherwise in cooperation with the transceiver 515, the one or more antennas 525, or any combination thereof. Although the communications manager 520 is illustrated as a separate component, in some implementations, one or more functions described with reference to the communications manager 520 may be supported by or performed by the processor 540, the memory 530, the code 535, or any combination thereof. For example, the code 535 may include instructions executable by the processor 540 to cause the device 505 to perform various aspects of beam failure declaration and reporting as described herein, or the processor 540 and the memory 530 may be otherwise configured to perform or support such operations.

Figure 6:
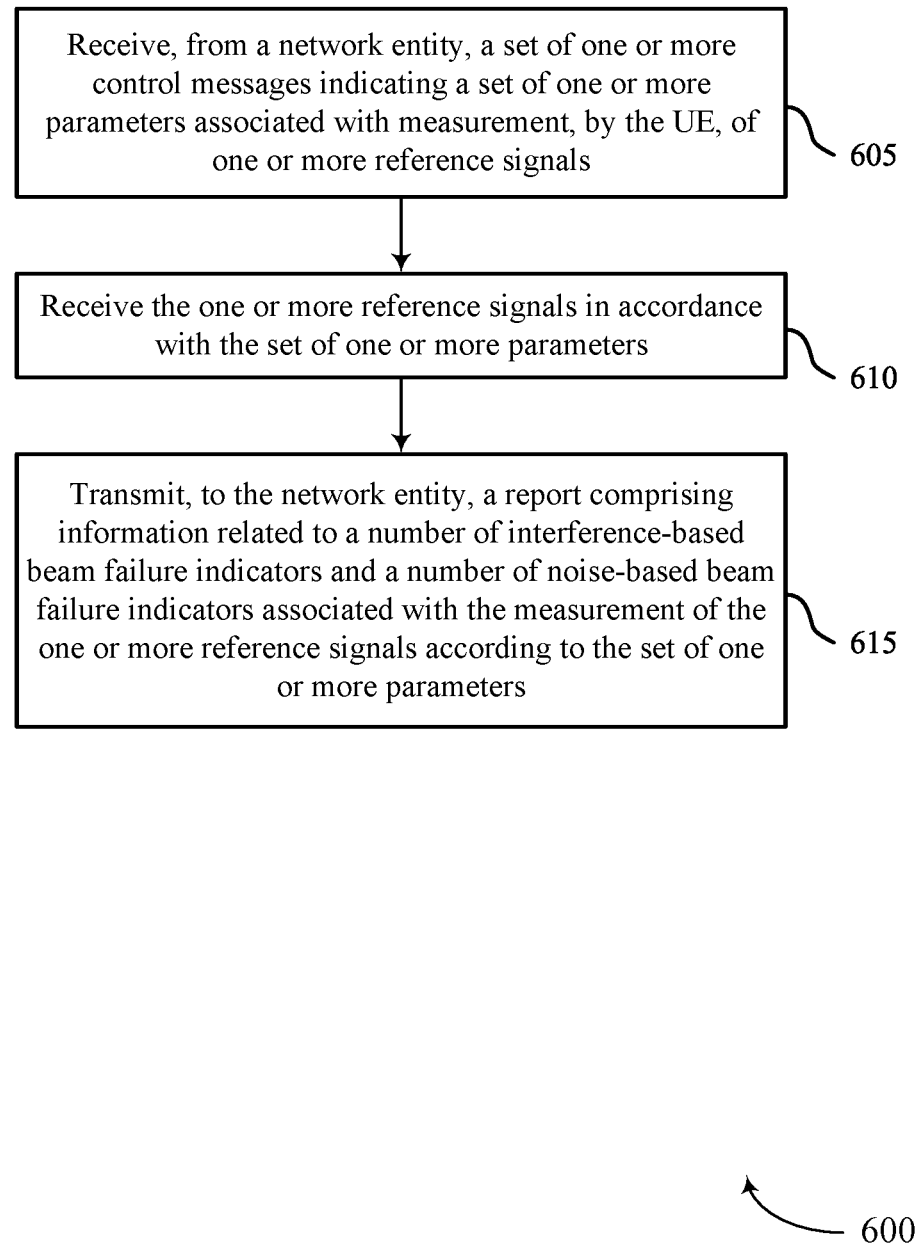
FIGS. 6 and 7 illustrate flowcharts illustrating example methods that support beam failure declaration and reporting.

FIG. 6 shows a flowchart illustrating an example method 600 that supports beam failure declaration and reporting. The operations of the method 600 may be implemented by a UE or its components as described herein. For example, the operations of the method 600 may be performed by a UE 115 as described with reference to FIGS. 1-4. In some implementations, a UE may execute a set of instructions to control the functional elements of the UE to perform the described functions. Additionally, or alternatively, the UE may perform aspects of the described functions using special-purpose hardware.

At 605, the method may include receiving, from a network entity, a set of one or more control messages indicating a set of one or more parameters associated with measurement, by the UE, of one or more reference signals. The operations of 605 may be performed in accordance with examples as disclosed herein. In some implementations, aspects of the operations of 605 may be performed by a communications manager 420 as described with reference to FIG. 4.

At 610, the method may include receiving the one or more reference signals in accordance with the set of one or more parameters. The operations of 610 may be performed in accordance with examples as disclosed herein. In some implementations, aspects of the operations of 610 may be performed by a communications manager 420 as described with reference to FIG. 4.

At 615, the method may include transmitting, to the network entity, a report including information related to a number of interference-based BFIs and a number of noise-based BFIs associated with the measurement of the one or more reference signals according to the set of one or more parameters. The operations of 615 may be performed in accordance with examples as disclosed herein. In some implementations, aspects of the operations of 615 may be performed by a communications manager 420 as described with reference to FIG. 4.

Figure 7:
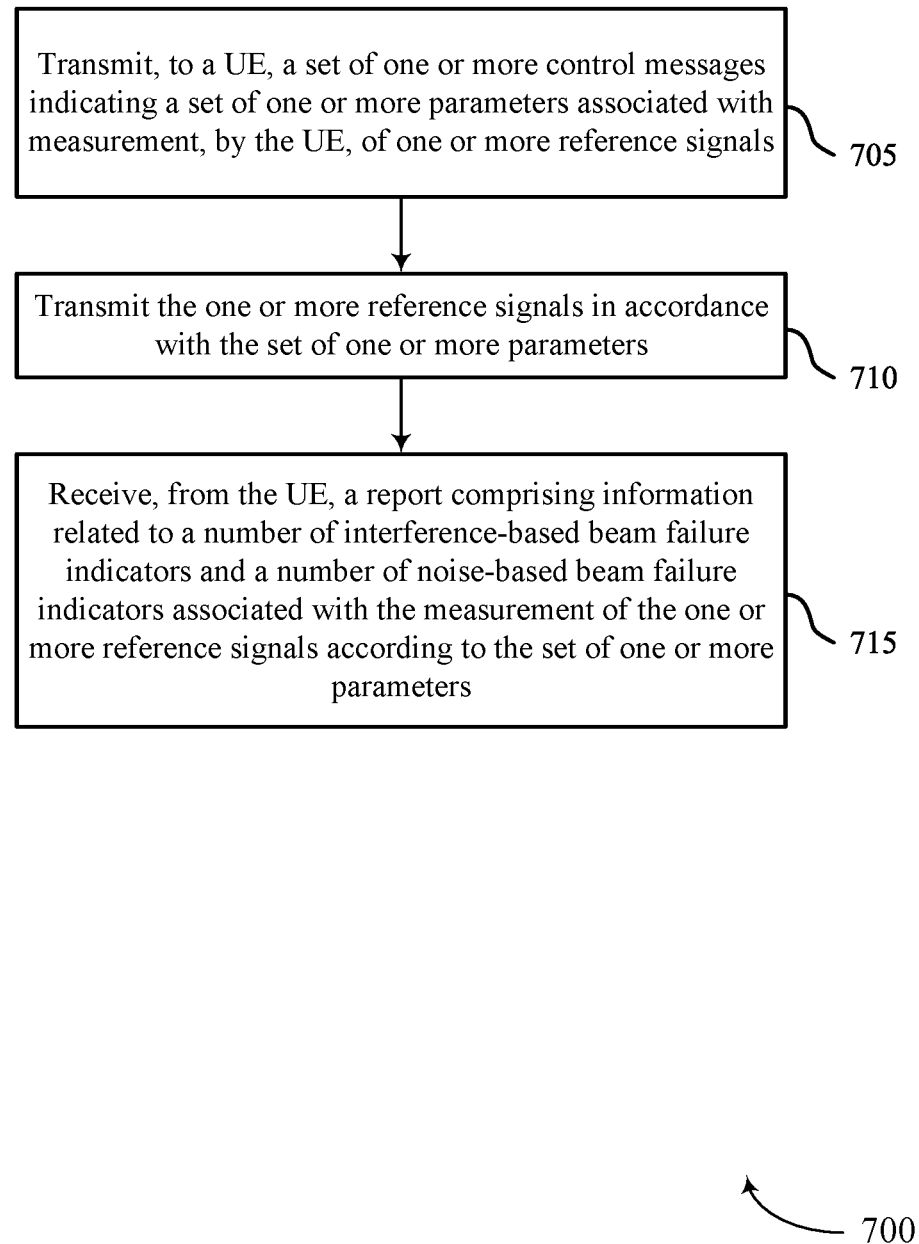

FIG. 7 shows a flowchart illustrating an example method 700 that supports beam failure declaration and reporting. The operations of the method 700 may be implemented by a BS, a network entity, or its components as described herein. For example, the operations of the method 700 may be performed by a BS 105 as described with reference to FIGS. 1-3 and 5. In some implementations, a BS may execute a set of instructions to control the functional elements of the BS to perform the described functions. Additionally, or alternatively, the BS may perform aspects of the described functions using special-purpose hardware.

At 705, the method may include transmitting, to a UE, a set of one or more control messages indicating a set of one or more parameters associated with measurement, by the UE, of one or more reference signals. The operations of 705 may be performed in accordance with examples as disclosed herein. In some implementations, aspects of the operations of 705 may be performed by a communications manager 520 as described with reference to FIG. 5.

At 710, the method may include transmitting the one or more reference signals in accordance with the set of one or more parameters. The operations of 710 may be performed in accordance with examples as disclosed herein. In some implementations, aspects of the operations of 710 may be performed by a communications manager 520 as described with reference to FIG. 5.

At 715, the method may include receiving, from the UE, a report including information related to a number of interference-based BFIs and a number of noise-based BFIs associated with the measurement of the one or more reference signals according to the set of one or more parameters. The operations of 715 may be performed in accordance with examples as disclosed herein. In some implementations, aspects of the operations of 715 may be performed by a communications manager 520 as described with reference to FIG. 5.

The following provides an overview of some aspects of the present disclosure:

Aspect 1: A method for wireless communications at a UE, including: receiving, from a network entity, a set of one or more control messages indicating a set of one or more parameters associated with measurement, by the UE, of one or more reference signals; receiving the one or more reference signals in accordance with the set of one or more parameters; and transmitting, to the network entity, a report including information related to a number of interference-based BFIs and a number of noise-based BFIs associated with the measurement of the one or more reference signals according to the set of one or more parameters.

Aspect 2: The method of aspect 1, further including: incrementing a first counter associated with interference-based BFIs based on a set of one or more identified interference-based BFIs associated with the measurement of the one or more reference signals, where the number of interference-based BFIs is included in the report based on the first counter.

Aspect 3: The method of aspect 2, further including: incrementing a second counter associated with noise-based BFIs based on a set of one or more identified noise-based BFIs associated with the measurement of the one or more reference signals, where the number of noise-based BFIs is included in the report based on the second counter.

Aspect 4: The method of any of aspects 1-3, where transmitting the report includes: transmitting, in the report, an indication of a percentage of the number of interference-based BFIs or the number of noise-based BFIs relative to a total number of BFIs detected by the UE.

Aspect 5: The method of any of aspects 1-4, where transmitting the report includes: transmitting, in the report, an indication of a pattern associated with the number of interference-based BFIs, the number of noise-based BFIs, or both.

Aspect 6: The method of any of aspects 1-5, further including: detecting a set of consecutive BFIs over a set of transmission time intervals based on the measurement of the one or more reference signals, the set of consecutive BFIs associated with one of the number of interference-based BFIs or the number of noise-based BFIs, where an indication of the set of consecutive BFIs is included in the report.

Aspect 7: The method of any of aspects 1-6, further including: detecting the number of interference-based BFIs, the number of noise-based BFIs, or both based on an ML model for beam failure detection, where the ML model is indicated based on the set of one or more parameters.

Aspect 8: The method of any of aspects 1-7, where transmitting the report includes: transmitting, in the report, an indication of a report history for each of the number of interference-based BFIs and the number of noise-based BFIs.

Aspect 9: The method of any of aspects 1-8, further including: receiving a second control message indicating a reporting configuration for reporting the information, where the report is transmitted in accordance with the reporting configuration.

Aspect 10: The method of aspect 9, further including: receiving a third control message indicating a switch from a second reporting configuration to the reporting configuration.

Aspect 11: The method of any of aspects 1-10, further including: receiving, from the network entity, an indication to activate or deactivate the measurement of the one or more reference signals in accordance with the set of one or more parameters.

Aspect 12: The method of any of aspects 1-11, further including: receiving, from the network entity, an indication to activate or deactivate reporting of the information related to the number of interference-based BFIs and the number of noise-based BFIs.

Aspect 13: The method of any of aspects 1-12, further including: transmitting, based on a capability of the UE, a request to activate the measurement of the one or more reference signals in accordance with the set of one or more parameters or activate reporting of the information related to the number of interference-based BFIs and the number of noise-based BFIs.

Aspect 14: The method of any of aspects 1-13, further including: receiving, from the network entity, an indication to switch from the set of one or more parameters to a second set of one or more parameters associated with a BFI type for each BFI associated with the measurement of the one or more reference signals by the UE.

Aspect 15: The method of any of aspects 1-14, where the set of one or more parameters includes: a first set of parameters including a reference signal type associated with the one or more reference signals, a periodicity associated with the one or more reference signals, or a combination thereof; and a second set of parameters including one or more types of BFIs, one or more measurement objects for measurement by the UE, one or more procedures associated with a BFI type for each BFI, one or more ML models associated with the BFI type for each BFI, or a combination thereof.

Aspect 16: The method of aspect 15, where each of the one or more measurement objects corresponds to a respective type of the one or more types of BFIs.

Aspect 17: A method for wireless communications at a network entity, including: transmitting, to a UE, a set of one or more control messages indicating a set of one or more parameters associated with measurement, by the UE, of one or more reference signals; transmitting the one or more reference signals in accordance with the set of one or more parameters; and receiving, from the UE, a report including information related to a number of interference-based BFIs and a number of noise-based BFIs associated with the measurement of the one or more reference signals according to the set of one or more parameters.

Aspect 18: The method of aspect 17, where receiving the report includes: receiving, in the report, an indication of a percentage of the number of interference-based BFIs or the number of noise-based BFIs relative to a total number of BFIs detected by the UE.

Aspect 19: The method of any of aspects 17 or 18, where receiving the report includes: receiving, in the report, an indication of a pattern associated with the number of interference-based BFIs, the number of noise-based BFIs, or both.

Aspect 20: The method of any of aspects 17-19, where receiving the report includes: receiving, in the report, an indication of a set of consecutive BFIs over a set of transmission time intervals detected by the UE, the set of consecutive BFIs associated with one of the number of interference-based BFIs or the number of noise-based BFIs.

Aspect 21: The method of any of aspects 17-20, where receiving the report includes: receiving, in the report, an indication of a report history for each of the number of interference-based BFIs and the number of noise-based BFIs.

Aspect 22: The method of any of aspects 17-21, further including: transmitting, to the UE, a second control message indicating a reporting configuration for reporting the information, where the report is received in accordance with the reporting configuration.

Aspect 23: The method of aspect 22, further including: transmitting, to the UE, a third control message indicating a switch from a second reporting configuration to the reporting configuration.

Aspect 24: The method of any of aspects 17-23, further including: transmitting, to the UE, an indication to activate or deactivate the measurement of the one or more reference signals in accordance with the set of one or more parameters.

Aspect 25: The method of any of aspects 17-24, further including: receiving, based on a capability of the UE, a request to activate the measurement of the one or more reference signals in accordance with the set of one or more parameters or activate reporting of the information related to the number of interference-based BFIs and the number of noise-based BFIs.

Aspect 26: The method of any of aspects 17-25, further including: transmitting, to the UE, an indication to switch from the set of one or more parameters to a second set of one or more parameters associated with a BFI type for each BFI associated with the measurement of the one or more reference signals by the UE.

Aspect 27: The method of any of aspects 17-26, where the set of one or more parameters includes: a first set of parameters including a reference signal type associated with the one or more reference signals, a periodicity associated with the one or more reference signals, or a combination thereof; and a second set of parameters including one or more types of BFIs, one or more measurement objects for measurement by the UE, one or more procedures associated with a BFI type for each BFI, one or more ML models associated with the BFI type for each BFI, or a combination thereof.

Aspect 28: The method of aspect 27, where each of the one or more measurement objects corresponds to a respective type of the one or more types of BFIs.

Aspect 29: An apparatus for wireless communications at a UE, including: a first interface configured to: obtain, from a network entity, a set of one or more control messages indicating a set of one or more parameters associated with measurement, by the UE, of one or more reference signals; and obtain the one or more reference signals in accordance with the set of one or more parameters; and the first interface or a second interface configured to: output, to the network entity, a report including information related to a number of interference-based BFIs and a number of noise-based BFIs associated with the measurement of the one or more reference signals according to the set of one or more parameters.

Aspect 30: The apparatus of aspect 29, further including a processing system configured to: increment a first counter associated with interference-based BFIs based on a set of one or more identified interference-based BFIs associated with the measurement of the one or more reference signals, where the number of interference-based BFIs is included in the report based on the first counter.

Aspect 31: The apparatus of aspect 30, the processing system further configured to: increment a second counter associated with noise-based BFIs based on a set of one or more identified noise-based BFIs associated with the measurement of the one or more reference signals, where the number of noise-based BFIs is included in the report based on the second counter.

Aspect 32: The apparatus of any of aspects 29-31, where outputting the report further includes: outputting, in the report, an indication of a percentage of the number of interference-based BFIs or the number of noise-based BFIs relative to a total number of BFIs detected by the UE.

Aspect 33: The apparatus of any of aspects 29-32, where outputting the report further includes: outputting, in the report, an indication of a pattern associated with the number of interference-based BFIs, the number of noise-based BFIs, or both.

Aspect 34: The apparatus of any of aspects 29-33, further including a processing system configured to: detect a set of consecutive BFIs over a set of transmission time intervals based on the measurement of the one or more reference signals, the set of consecutive BFIs associated with one of the number of interference-based BFIs or the number of noise-based BFIs, where an indication of the set of consecutive BFIs is included in the report.

Aspect 35: The apparatus of any of aspects 29-34, further including a processing system configured to: detect the number of interference-based BFIs, the number of noise-based BFIs, or both based on an ML model for BFD, where the ML model is indicated based on the set of one or more parameters.

Aspect 36: The apparatus of any of aspects 29-35, where outputting the report further includes: outputting, in the report, an indication of a report history for each of the number of interference-based BFIs and the number of noise-based BFIs.

Aspect 37: The apparatus of any of aspects 29-36, where the first interface or the second interface are further configured to: obtain a second control message indicating a reporting configuration for reporting the information, where the report is output in accordance with the reporting configuration.

Aspect 38: The apparatus of aspect 37, where the first interface or the second interface are further configured to: obtain a third control message indicating a switch from a second reporting configuration to the reporting configuration.

Aspect 39: The apparatus of any of aspects 29-38, where the first interface or the second interface are further configured to: obtain, from the network entity, an indication to activate or deactivate the measurement of the one or more reference signals in accordance with the set of one or more parameters.

Aspect 40: The apparatus of any of aspects 29-39, where the first interface or the second interface are further configured to: obtain, from the network entity, an indication to activate or deactivate reporting of the information related to the number of interference-based BFIs and the number of noise-based BFIs.

Aspect 41: The apparatus of any of aspects 29-40, where the first interface or the second interface are further configured to: output, based on a capability of the UE, a request to activate the measurement of the one or more reference signals in accordance with the set of one or more parameters or activate reporting of the information related to the number of interference-based BFIs and the number of noise-based BFIs.

Aspect 42: The apparatus of any of aspects 29-41, where the first interface or the second interface are further configured to: obtain, from the network entity, an indication to switch from the set of one or more parameters to a second set of one or more parameters associated with a BFI type for each BFI associated with the measurement of the one or more reference signals by the UE.

Aspect 43: The apparatus of any of aspects 29-42, where the set of one or more parameters includes: a first set of parameters including a reference signal type associated with the one or more reference signals, a periodicity associated with the one or more reference signals, or a combination thereof; and a second set of parameters including one or more types of BFIs, one or more measurement objects for measurement by the UE, one or more procedures associated with a BFI type for each BFI, one or more ML models associated with the BFI type for each BFI, or a combination thereof.

Aspect 44: The apparatus of aspect 43, where each of the one or more measurement objects corresponds to a respective type of the one or more types of BFIs.

Aspect 45: An apparatus for wireless communications at a network entity, including: a first interface configured to: output, to a UE, a set of one or more control messages indicating a set of one or more parameters associated with measurement, by the UE, of one or more reference signals; and output the one or more reference signals in accordance with the set of one or more parameters; and the first interface or a second interface configured to: obtain, from the UE, a report including information related to a number of interference-based BFIs and a number of noise-based BFIs associated with the measurement of the one or more reference signals according to the set of one or more parameters.

Aspect 46: The apparatus of aspect 45, where obtaining the report further includes: obtaining, in the report, an indication of a percentage of the number of interference-based BFIs or the number of noise-based BFIs relative to a total number of BFIs detected by the UE.

Aspect 47: The apparatus of any of aspects 45-46, where obtaining the report further includes: obtaining, in the report, an indication of a pattern associated with the number of interference-based BFIs, the number of noise-based BFIs, or both.

Aspect 48: The apparatus of any of aspects 45-47, where obtaining the report further includes: obtaining, in the report, an indication of a set of consecutive BFIs over a set of transmission time intervals detected by the UE, the set of consecutive BFIs associated with one of the number of interference-based BFIs or the number of noise-based BFIs.

Aspect 49: The apparatus of any of aspects 45-48, where obtaining the report further includes: obtaining, in the report, an indication of a report history for each of the number of interference-based BFIs and the number of noise-based BFIs.

Aspect 50: The apparatus of any of aspects 45-49, where the first interface or the second interface are further configured to: output, to the UE, a second control message indicating a reporting configuration for reporting the information, where the report is obtained in accordance with the reporting configuration.

Aspect 51: The apparatus of aspect 50, where the first interface or the second interface are further configured to: output, to the UE, a third control message indicating a switch from a second reporting configuration to the reporting configuration.

Aspect 52: The apparatus of any of aspects 45-51, where the first interface or the second interface are further configured to: output, to the UE, an indication to activate or deactivate the measurement of the one or more reference signals in accordance with the set of one or more parameters.

Aspect 53: The apparatus of any of aspects 45-52, where the first interface or the second interface are further configured to: obtain, based on a capability of the UE, a request to activate the measurement of the one or more reference signals in accordance with the set of one or more parameters or activate reporting of the information related to the number of interference-based BFIs and the number of noise-based BFIs.

Aspect 54: The apparatus of any of aspects 45-53, where the first interface or the second interface are further configured to: output, to the UE, an indication to switch from the set of one or more parameters to a second set of one or more parameters associated with a BFI type for each BFI associated with the measurement of the one or more reference signals by the UE.

Aspect 55: The apparatus of any of aspects 45-54, where the set of one or more parameters includes: a first set of parameters including a reference signal type associated with the one or more reference signals, a periodicity associated with the one or more reference signals, or a combination thereof; and a second set of parameters including one or more types of BFIs, one or more measurement objects for measurement by the UE, one or more procedures associated with a BFI type for each BFI, one or more ML models associated with the BFI type for each BFI, or a combination thereof.

Aspect 56: The apparatus of aspect 55, where each of the one or more measurement objects corresponds to a respective type of the one or more types of BFIs.

Aspect 57: An apparatus for wireless communications at a UE, including: a processor; memory coupled with the processor; and instructions stored in the memory and executable by the processor to cause the apparatus to: receive, from a network entity, a set of one or more control messages indicating a set of one or more parameters associated with measurement, by the UE, of one or more reference signals; receive the one or more reference signals in accordance with the set of one or more parameters; and transmit, to the network entity, a report including information related to a number of interference-based BFIs and a number of noise-based BFIs associated with the measurement of the one or more reference signals according to the set of one or more parameters.

Aspect 58: The apparatus of aspect 57, where the instructions are further executable by the processor to cause the apparatus to: increment a first counter associated with interference-based BFIs based on a set of one or more identified interference-based BFIs associated with the measurement of the one or more reference signals, where the number of interference-based BFIs is included in the report based on the first counter.

Aspect 59: The apparatus of aspect 58, where the instructions are further executable by the processor to cause the apparatus to: increment a second counter associated with noise-based BFIs based on a set of one or more identified noise-based BFIs associated with the measurement of the one or more reference signals, where the number of noise-based BFIs is included in the report based on the second counter.

Aspect 60: The apparatus of any of aspects 57-59, where the instructions to transmit the report are executable by the processor to cause the apparatus to: transmit, in the report, an indication of a percentage of the number of interference-based BFIs or the number of noise-based BFIs relative to a total number of BFIs detected by the UE.

Aspect 61: The apparatus of any of aspects 57-60, where the instructions to transmit the report are executable by the processor to cause the apparatus to: transmit, in the report, an indication of a pattern associated with the number of interference-based BFIs, the number of noise-based BFIs, or both.

Aspect 62: The apparatus of any of aspects 57-61, where the instructions are further executable by the processor to cause the apparatus to: detect a set of consecutive BFIs over a set of transmission time intervals based on the measurement of the one or more reference signals, the set of consecutive BFIs associated with one of the number of interference-based BFIs or the number of noise-based BFIs, where an indication of the set of consecutive BFIs is included in the report.

Aspect 63: The apparatus of any of aspects 57-62, where the instructions are further executable by the processor to cause the apparatus to: detect the number of interference-based BFIs, the number of noise-based BFIs, or both based on an ML model for beam failure detection, where the ML model is indicated based on the set of one or more parameters.

Aspect 64: The apparatus of any of aspects 57-63, where the instructions to transmit the report are executable by the processor to cause the apparatus to: transmit, in the report, an indication of a report history for each of the number of interference-based BFIs and the number of noise-based BFIs.

Aspect 65: The apparatus of any of aspects 57-64, where the instructions are further executable by the processor to cause the apparatus to: receive a second control message indicating a reporting configuration for reporting the information, where the report is transmitted in accordance with the reporting configuration.

Aspect 66: The apparatus of aspect 65, where the instructions are further executable by the processor to cause the apparatus to: receive a third control message indicating a switch from a second reporting configuration to the reporting configuration.

Aspect 67: The apparatus of any of aspects 57-66, where the instructions are further executable by the processor to cause the apparatus to: receive, from the network entity, an indication to activate or deactivate the measurement of the one or more reference signals in accordance with the set of one or more parameters.

Aspect 68: The apparatus of any of aspects 57-67, where the instructions are further executable by the processor to cause the apparatus to: receive, from the network entity, an indication to activate or deactivate reporting of the information related to the number of interference-based BFIs and the number of noise-based BFIs.

Aspect 69: The apparatus of any of aspects 57-68, where the instructions are further executable by the processor to cause the apparatus to: transmit, based on a capability of the UE, a request to activate the measurement of the one or more reference signals in accordance with the set of one or more parameters or activate reporting of the information related to the number of interference-based BFIs and the number of noise-based BFIs.

Aspect 70: The apparatus of any of aspects 57-69, where the instructions are further executable by the processor to cause the apparatus to: receive, from the network entity, an indication to switch from the set of one or more parameters to a second set of one or more parameters associated with a BFI type for each BFI associated with the measurement of the one or more reference signals by the UE.

Aspect 71: The apparatus of any of aspects 57-70, where the instructions to set of one or more parameters are executable by the processor to cause the apparatus to: a first set of parameters include a reference signal type associated with the one or more reference signals, a periodicity associated with the one or more reference signals, or a combination thereof and a second set of parameters include one or more types of BFIs, one or more measurement objects for measurement by the UE, one or more procedures associated with a BFI type for each BFI, one or more ML models associated with the BFI type for each BFI, or a combination thereof.

Aspect 72: The apparatus of aspect 71, where: each of the one or more measurement objects corresponds to a respective type of the one or more types of BFIs.

Aspect 73: An apparatus for wireless communications at a network entity, including: a processor; memory coupled with the processor; and instructions stored in the memory and executable by the processor to cause the apparatus to: transmit, to a UE, a set of one or more control messages indicating a set of one or more parameters associated with measurement, by the UE, of one or more reference signals; transmit the one or more reference signals in accordance with the set of one or more parameters; and receive, from the UE, a report including information related to a number of interference-based BFIs and a number of noise-based BFIs associated with the measurement of the one or more reference signals according to the set of one or more parameters.

Aspect 74: The apparatus of aspect 73, where the instructions to receive the report are executable by the processor to cause the apparatus to: receive, in the report, an indication of a percentage of the number of interference-based BFIs or the number of noise-based BFIs relative to a total number of BFIs detected by the UE.

Aspect 75: The apparatus of any of aspects 73 or 74, where the instructions to receive the report are executable by the processor to cause the apparatus to: receive, in the report, an indication of a pattern associated with the number of interference-based BFIs, the number of noise-based BFIs, or both.

Aspect 76: The apparatus of any of aspects 73-75, where the instructions to receive the report are executable by the processor to cause the apparatus to: receive, in the report, an indication of a set of consecutive BFIs over a set of transmission time intervals detected by the UE, the set of consecutive BFIs associated with one of the number of interference-based BFIs or the number of noise-based BFIs.

Aspect 77: The apparatus of any of aspects 73-76, where the instructions to receive the report are executable by the processor to cause the apparatus to: receive, in the report, an indication of a report history for each of the number of interference-based BFIs and the number of noise-based BFIs.

Aspect 78: The apparatus of any of aspects 73-77, where the instructions are further executable by the processor to cause the apparatus to: transmit, to the UE, a second control message indicating a reporting configuration for reporting the information, where the report is received in accordance with the reporting configuration.

Aspect 79: The apparatus of aspect 78, where the instructions are further executable by the processor to cause the apparatus to: transmit, to the UE, a third control message indicating a switch from a second reporting configuration to the reporting configuration.

Aspect 80: The apparatus of any of aspects 73-79, where the instructions are further executable by the processor to cause the apparatus to: transmit, to the UE, an indication to activate or deactivate the measurement of the one or more reference signals in accordance with the set of one or more parameters.

Aspect 81: The apparatus of any of aspects 73-80, where the instructions are further executable by the processor to cause the apparatus to: receive, based on a capability of the UE, a request to activate the measurement of the one or more reference signals in accordance with the set of one or more parameters or activate reporting of the information related to the number of interference-based BFIs and the number of noise-based BFIs.

Aspect 82: The apparatus of any of aspects 73-81, where the instructions are further executable by the processor to cause the apparatus to: transmit, to the UE, an indication to switch from the set of one or more parameters to a second set of one or more parameters associated with a BFI type for each BFI associated with the measurement of the one or more reference signals by the UE.

Aspect 83: The apparatus of any of aspects 73-82, where the instructions to set of one or more parameters are executable by the processor to cause the apparatus to: a first set of parameters include a reference signal type associated with the one or more reference signals, a periodicity associated with the one or more reference signals, or a combination thereof and a second set of parameters include one or more types of BFIs, one or more measurement objects for measurement by the UE, one or more procedures associated with a BFI type for each BFI, one or more ML models associated with the BFI type for each BFI, or a combination thereof.

Aspect 84: The apparatus of aspect 83, where: each of the one or more measurement objects corresponds to a respective type of the one or more types of BFIs.

Aspect 85: An apparatus for wireless communications at a UE, including: means for receiving, from a network entity, a set of one or more control messages indicating a set of one or more parameters associated with measurement, by the UE, of one or more reference signals; means for receiving the one or more reference signals in accordance with the set of one or more parameters; and means for transmitting, to the network entity, a report including information related to a number of interference-based BFIs and a number of noise-based BFIs associated with the measurement of the one or more reference signals according to the set of one or more parameters.

Aspect 86: The apparatus of aspect 85, further including: means for incrementing a first counter associated with interference-based BFIs based on a set of one or more identified interference-based BFIs associated with the measurement of the one or more reference signals, where the number of interference-based BFIs is included in the report based on the first counter.

Aspect 87: The apparatus of aspect 86, further including: means for incrementing a second counter associated with noise-based BFIs based on a set of one or more identified noise-based BFIs associated with the measurement of the one or more reference signals, where the number of noise-based BFIs is included in the report based on the second counter.

Aspect 88: The apparatus of any of aspects 85-87, where the means for transmitting the report include: means for transmitting, in the report, an indication of a percentage of the number of interference-based BFIs or the number of noise-based BFIs relative to a total number of BFIs detected by the UE.

Aspect 89: The apparatus of any of aspects 85-88, where the means for transmitting the report include: means for transmitting, in the report, an indication of a pattern associated with the number of interference-based BFIs, the number of noise-based BFIs, or both.

Aspect 90: The apparatus of any of aspects 85-89, further including: means for detecting a set of consecutive BFIs over a set of transmission time intervals based on the measurement of the one or more reference signals, the set of consecutive BFIs associated with one of the number of interference-based BFIs or the number of noise-based BFIs, where an indication of the set of consecutive BFIs is included in the report.

Aspect 91: The apparatus of any of aspects 85-90, further including: means for detecting the number of interference-based BFIs, the number of noise-based BFIs, or both based on an ML model for beam failure detection, where the ML model is indicated based on the set of one or more parameters.

Aspect 92: The apparatus of any of aspects 85-91, where the means for transmitting the report include: means for transmitting, in the report, an indication of a report history for each of the number of interference-based BFIs and the number of noise-based BFIs.

Aspect 93: The apparatus of any of aspects 85-92, further including: means for receiving a second control message indicating a reporting configuration for reporting the information, where the report is transmitted in accordance with the reporting configuration.

Aspect 94: The apparatus of aspect 93, further including: means for receiving a third control message indicating a switch from a second reporting configuration to the reporting configuration.

Aspect 95: The apparatus of any of aspects 85-94, further including: means for receiving, from the network entity, an indication to activate or deactivate the measurement of the one or more reference signals in accordance with the set of one or more parameters.

Aspect 96: The apparatus of any of aspects 85-95, further including: means for receiving, from the network entity, an indication to activate or deactivate reporting of the information related to the number of interference-based BFIs and the number of noise-based BFIs.

Aspect 97: The apparatus of any of aspects 85-96, further including: means for transmitting, based on a capability of the UE, a request to activate the measurement of the one or more reference signals in accordance with the set of one or more parameters or activate reporting of the information related to the number of interference-based BFIs and the number of noise-based BFIs.

Aspect 98: The apparatus of any of aspects 85-97, further including: means for receiving, from the network entity, an indication to switch from the set of one or more parameters to a second set of one or more parameters associated with a BFI type for each BFI associated with the measurement of the one or more reference signals by the UE.

Aspect 99: The apparatus of any of aspects 85-98, where the means for the set of one or more parameters include: means for a first set of parameters including a reference signal type associated with the one or more reference signals, a periodicity associated with the one or more reference signals, or a combination thereof; and means for a second set of parameters including one or more types of BFIs, one or more measurement objects for measurement by the UE, one or more procedures associated with a BFI type for each BFI, one or more ML models associated with the BFI type for each BFI, or a combination thereof.

Aspect 100: The apparatus of aspect 99, where: each of the one or more measurement objects corresponds to a respective type of the one or more types of BFIs.

Aspect 101: An apparatus for wireless communications at a network entity, including: means for transmitting, to a UE, a set of one or more control messages indicating a set of one or more parameters associated with measurement, by the UE, of one or more reference signals; means for transmitting the one or more reference signals in accordance with the set of one or more parameters; and means for receiving, from the UE, a report including information related to a number of interference-based BFIs and a number of noise-based BFIs associated with the measurement of the one or more reference signals according to the set of one or more parameters.

Aspect 102: The apparatus of aspect 101, where the means for receiving the report include: means for receiving, in the report, an indication of a percentage of the number of interference-based BFIs or the number of noise-based BFIs relative to a total number of BFIs detected by the UE.

Aspect 103: The apparatus of any of aspects 101 or 102, where the means for receiving the report include: means for receiving, in the report, an indication of a pattern associated with the number of interference-based BFIs, the number of noise-based BFIs, or both.

Aspect 104: The apparatus of any of aspects 101-103, where the means for receiving the report include: means for receiving, in the report, an indication of a set of consecutive BFIs over a set of transmission time intervals detected by the UE, the set of consecutive BFIs associated with one of the number of interference-based BFIs or the number of noise-based BFIs.

Aspect 105: The apparatus of any of aspects 101-104, where the means for receiving the report include: means for receiving, in the report, an indication of a report history for each of the number of interference-based BFIs and the number of noise-based BFIs.

Aspect 106: The apparatus of any of aspects 101-105, further including: means for transmitting, to the UE, a second control message indicating a reporting configuration for reporting the information, where the report is received in accordance with the reporting configuration.

Aspect 107: The apparatus of aspect 106, further including: means for transmitting, to the UE, a third control message indicating a switch from a second reporting configuration to the reporting configuration.

Aspect 108: The apparatus of any of aspects 101-107, further including: means for transmitting, to the UE, an indication to activate or deactivate the measurement of the one or more reference signals in accordance with the set of one or more parameters.

Aspect 109: The apparatus of any of aspects 101-108, further including: means for receiving, based on a capability of the UE, a request to activate the measurement of the one or more reference signals in accordance with the set of one or more parameters or activate reporting of the information related to the number of interference-based BFIs and the number of noise-based BFIs.

Aspect 110: The apparatus of any of aspects 101-109, further including: means for transmitting, to the UE, an indication to switch from the set of one or more parameters to a second set of one or more parameters associated with a BFI type for each BFI associated with the measurement of the one or more reference signals by the UE.

Aspect 111: The apparatus of any of aspects 101-110, where the means for the set of one or more parameters include: means for a first set of parameters including a reference signal type associated with the one or more reference signals, a periodicity associated with the one or more reference signals, or a combination thereof; and means for a second set of parameters including one or more types of BFIs, one or more measurement objects for measurement by the UE, one or more procedures associated with a BFI type for each BFI, one or more ML models associated with the BFI type for each BFI, or a combination thereof.

Aspect 112: The apparatus of aspect 111, where: each of the one or more measurement objects corresponds to a respective type of the one or more types of BFIs.

Aspect 113: A non-transitory computer-readable medium storing code for wireless communications at a UE, the code including instructions executable by a processor to: receive, from a network entity, a set of one or more control messages indicating a set of one or more parameters associated with measurement, by the UE, of one or more reference signals; receive the one or more reference signals in accordance with the set of one or more parameters; and transmit, to the network entity, a report including information related to a number of interference-based BFIs and a number of noise-based BFIs associated with the measurement of the one or more reference signals according to the set of one or more parameters.

Aspect 114: The non-transitory computer-readable medium of aspect 113, where the instructions are further executable by the processor to: increment a first counter associated with interference-based BFIs based on a set of one or more identified interference-based BFIs associated with the measurement of the one or more reference signals, where the number of interference-based BFIs is included in the report based on the first counter.

Aspect 115: The non-transitory computer-readable medium of aspect 114, where the instructions are further executable by the processor to: increment a second counter associated with noise-based BFIs based on a set of one or more identified noise-based BFIs associated with the measurement of the one or more reference signals, where the number of noise-based BFIs is included in the report based on the second counter.

Aspect 116: The non-transitory computer-readable medium of any of aspects 113-115, where the instructions to transmit the report are executable by the processor to: transmit, in the report, an indication of a percentage of the number of interference-based BFIs or the number of noise-based BFIs relative to a total number of BFIs detected by the UE.

Aspect 117: The non-transitory computer-readable medium of any of aspects 113-116, where the instructions to transmit the report are executable by the processor to: transmit, in the report, an indication of a pattern associated with the number of interference-based BFIs, the number of noise-based BFIs, or both.

Aspect 118: The non-transitory computer-readable medium of any of aspects 113-117, where the instructions are further executable by the processor to: detect a set of consecutive BFIs over a set of transmission time intervals based on the measurement of the one or more reference signals, the set of consecutive BFIs associated with one of the number of interference-based BFIs or the number of noise-based BFIs, where an indication of the set of consecutive BFIs is included in the report.

Aspect 119: The non-transitory computer-readable medium of any of aspects 113-118, where the instructions are further executable by the processor to: detect the number of interference-based BFIs, the number of noise-based BFIs, or both based on an ML model for beam failure detection, where the ML model is indicated based on the set of one or more parameters.

Aspect 120: The non-transitory computer-readable medium of any of aspects 113-119, where the instructions to transmit the report are executable by the processor to: transmit, in the report, an indication of a report history for each of the number of interference-based BFIs and the number of noise-based BFIs.

Aspect 121: The non-transitory computer-readable medium of any of aspects 113-120, where the instructions are further executable by the processor to: receive a second control message indicating a reporting configuration for reporting the information, where the report is transmitted in accordance with the reporting configuration.

Aspect 122: The non-transitory computer-readable medium of aspect 121, where the instructions are further executable by the processor to: receive a third control message indicating a switch from a second reporting configuration to the reporting configuration.

Aspect 123: The non-transitory computer-readable medium of any of aspects 113-122, where the instructions are further executable by the processor to: receive, from the network entity, an indication to activate or deactivate the measurement of the one or more reference signals in accordance with the set of one or more parameters.

Aspect 124: The non-transitory computer-readable medium of any of aspects 113-123, where the instructions are further executable by the processor to: receive, from the network entity, an indication to activate or deactivate reporting of the information related to the number of interference-based BFIs and the number of noise-based BFIs.

Aspect 125: The non-transitory computer-readable medium of any of aspects 113-124, where the instructions are further executable by the processor to: transmit, based on a capability of the UE, a request to activate the measurement of the one or more reference signals in accordance with the set of one or more parameters or activate reporting of the information related to the number of interference-based BFIs and the number of noise-based BFIs.

Aspect 126: The non-transitory computer-readable medium of any of aspects 113-125, where the instructions are further executable by the processor to: receive, from the network entity, an indication to switch from the set of one or more parameters to a second set of one or more parameters associated with a BFI type for each BFI associated with the measurement of the one or more reference signals by the UE.

Aspect 127: The non-transitory computer-readable medium of any of aspects 113-126, where the instructions to set of one or more parameters are executable by the processor to: a first set of parameters include a reference signal type associated with the one or more reference signals, a periodicity associated with the one or more reference signals, or a combination thereof and a second set of parameters include one or more types of BFIs, one or more measurement objects for measurement by the UE, one or more procedures associated with a BFI type for each BFI, one or more ML models associated with the BFI type for each BFI, or a combination thereof.

Aspect 128: The non-transitory computer-readable medium of aspect 127, where: each of the one or more measurement objects corresponds to a respective type of the one or more types of BFIs.

Aspect 129: A non-transitory computer-readable medium storing code for wireless communications at a network entity, the code including instructions executable by a processor to: transmit, to a UE, a set of one or more control messages indicating a set of one or more parameters associated with measurement, by the UE, of one or more reference signals; transmit the one or more reference signals in accordance with the set of one or more parameters; and receive, from the UE, a report including information related to a number of interference-based BFIs and a number of noise-based BFIs associated with the measurement of the one or more reference signals according to the set of one or more parameters.

Aspect 130: The non-transitory computer-readable medium of aspect 129, where the instructions to receive the report are executable by the processor to: receive, in the report, an indication of a percentage of the number of interference-based BFIs or the number of noise-based BFIs relative to a total number of BFIs detected by the UE.

Aspect 131: The non-transitory computer-readable medium of any of aspects 129 or 130, where the instructions to receive the report are executable by the processor to: receive, in the report, an indication of a pattern associated with the number of interference-based BFIs, the number of noise-based BFIs, or both.

Aspect 132: The non-transitory computer-readable medium of any of aspects 129-131, where the instructions to receive the report are executable by the processor to: receive, in the report, an indication of a set of consecutive BFIs over a set of transmission time intervals detected by the UE, the set of consecutive BFIs associated with one of the number of interference-based BFIs or the number of noise-based BFIs.

Aspect 133: The non-transitory computer-readable medium of any of aspects 129-132, where the instructions to receive the report are executable by the processor to: receive, in the report, an indication of a report history for each of the number of interference-based BFIs and the number of noise-based BFIs.

Aspect 134: The non-transitory computer-readable medium of any of aspects 129-133, where the instructions are further executable by the processor to: transmit, to the UE, a second control message indicating a reporting configuration for reporting the information, where the report is received in accordance with the reporting configuration.

Aspect 135: The non-transitory computer-readable medium of aspect 134, where the instructions are further executable by the processor to: transmit, to the UE, a third control message indicating a switch from a second reporting configuration to the reporting configuration.

Aspect 136: The non-transitory computer-readable medium of any of aspects 129-135, where the instructions are further executable by the processor to: transmit, to the UE, an indication to activate or deactivate the measurement of the one or more reference signals in accordance with the set of one or more parameters.

Aspect 137: The non-transitory computer-readable medium of any of aspects 129-136, where the instructions are further executable by the processor to: receive, based on a capability of the UE, a request to activate the measurement of the one or more reference signals in accordance with the set of one or more parameters or activate reporting of the information related to the number of interference-based BFIs and the number of noise-based BFIs.

Aspect 138: The non-transitory computer-readable medium of any of aspects 129-137, where the instructions are further executable by the processor to: transmit, to the UE, an indication to switch from the set of one or more parameters to a second set of one or more parameters associated with a BFI type for each BFI associated with the measurement of the one or more reference signals by the UE.

Aspect 139: The non-transitory computer-readable medium of any of aspects 129-138, where the instructions to set of one or more parameters are executable by the processor to: a first set of parameters include a reference signal type associated with the one or more reference signals, a periodicity associated with the one or more reference signals, or a combination thereof; and a second set of parameters include one or more types of BFIs, one or more measurement objects for measurement by the UE, one or more procedures associated with a BFI type for each BFI, one or more ML models associated with the BFI type for each BFI, or a combination thereof.

Aspect 140: The non-transitory computer-readable medium of aspect 139, where: each of the one or more measurement objects corresponds to a respective type of the one or more types of BFIs.

As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, and the like. Also, "determining" can include receiving (such as receiving information), accessing (such as accessing data in a memory) and the like. Also, "determining" can include resolving, selecting, choosing, establishing and other such similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described herein. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, such as one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described herein as acting in some combinations and even initially claimed as such, one or more features from a claimed combination can be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described herein should not be understood as requiring such separation in all implementations, and it should be understood that the described program components and systems can generally be integrated together in a single software product or packaged into multiple software products. Additionally, other implementations are within the scope of the following claims. In some implementations, the actions recited in the claims can be performed in a different order and still achieve desirable results.

What is claimed is:

1. An apparatus for wireless communications at a user equipment (UE), comprising:
a processing system that includes one or more processors and one or more memories coupled with the one or more processors, the processing system configured to cause the apparatus to:
obtain, from a network entity, a set of one or more control messages indicating a set of one or more parameters associated with measurement, by the UE, of one or more reference signals;
obtain the one or more reference signals in accordance with the set of one or more parameters; and
output, to the network entity, a report comprising information related to a quantity of interference-based beam failure indicators and a quantity of noise-based beam failure indicators associated with the measurement of the one or more reference signals according to the set of one or more parameters.

2. The apparatus of claim 1, wherein the processing system is further configured to cause the apparatus to:
increment a first counter associated with interference-based beam failure indicators based at least in part on a set of one or more identified interference-based beam failure indicators associated with the measurement of the one or more reference signals, wherein the quantity of interference-based beam failure indicators is included in the report based at least in part on the first counter.

3. The apparatus of claim 2, wherein the processing system is further configured to cause the apparatus to:
increment a second counter associated with noise-based beam failure indicators based at least in part on a set of one or more identified noise-based beam failure indicators associated with the measurement of the one or more reference signals, wherein the quantity of noise-based beam failure indicators is included in the report based at least in part on the second counter.

4. The apparatus of claim 1, wherein the processing system is further configured to cause the apparatus to:
output, in the report, an indication of a percentage of the quantity of interference-based beam failure indicators or the quantity of noise-based beam failure indicators relative to a total quantity of beam failure indicators detected by the UE.

5. The apparatus of claim 1, wherein the processing system is further configured to cause the apparatus to:
output, in the report, an indication of a pattern associated with the quantity of interference-based beam failure indicators, the quantity of noise-based beam failure indicators, or both.

6. The apparatus of claim 1, wherein the processing system is further configured to cause the apparatus to:
detect a set of consecutive beam failure indicators over a set of transmission time intervals based at least in part on the measurement of the one or more reference signals, the set of consecutive beam failure indicators associated with one of the quantity of interference-based beam failure indicators or the quantity of noise-based beam failure indicators, wherein an indication of the set of consecutive beam failure indicators is included in the report.

7. The apparatus of claim 1, wherein the processing system is further configured to cause the apparatus to:
detect the quantity of interference-based beam failure indicators, the quantity of noise-based beam failure indicators, or both based at least in part on a machine learning model for BFD, wherein the machine learning model is indicated based at least in part on the set of one or more parameters.

8. The apparatus of claim 1, wherein the processing system is further configured to cause the apparatus to:
output, in the report, an indication of a report history for each of the quantity of interference-based beam failure indicators and the quantity of noise-based beam failure indicators.

9. The apparatus of claim 1, wherein the processing system is further configured to cause the apparatus to:
obtain a second control message indicating a reporting configuration for reporting the information, wherein the report is output in accordance with the reporting configuration.

10. The apparatus of claim 9, wherein the processing system is further configured to cause the apparatus to:
obtain a third control message indicating a switch from a second reporting configuration to the reporting configuration.

11. The apparatus of claim 1, wherein the processing system is further configured to cause the apparatus to:
obtain, from the network entity, an indication to activate or deactivate the measurement of the one or more reference signals in accordance with the set of one or more parameters.

12. The apparatus of claim 1, wherein the processing system is further configured to cause the apparatus to:
obtain, from the network entity, an indication to activate or deactivate reporting of the information related to the quantity of interference-based beam failure indicators and the quantity of noise-based beam failure indicators.

13. The apparatus of claim 1, wherein the processing system is further configured to cause the apparatus to:
output, based at least in part on a capability of the UE, a request to activate the measurement of the one or more reference signals in accordance with the set of one or more parameters or activate reporting of the information related to the quantity of interference-based beam failure indicators and the quantity of noise-based beam failure indicators.

14. The apparatus of claim 1, wherein the processing system is further configured to cause the apparatus to:
obtain, from the network entity, an indication to switch from the set of one or more parameters to a second set of one or more parameters associated with a beam failure indicator type for each beam failure indicator associated with the measurement of the one or more reference signals by the UE.

15. An apparatus for wireless communications at a network entity, comprising:
a processing system that includes one or more processors and one or more memories coupled with the one or more processors, the processing system configured to cause the apparatus to:
output, to a user equipment (UE), a set of one or more control messages indicating a set of one or more parameters associated with measurement, by the UE, of one or more reference signals;
output the one or more reference signals in accordance with the set of one or more parameters; and
obtain, from the UE, a report comprising information related to a quantity of interference-based beam failure indicators and a quantity of noise-based beam failure indicators associated with the measurement of the one or more reference signals according to the set of one or more parameters.

16. The apparatus of claim 15, wherein the processing system is further configured to cause the apparatus to:
obtain, in the report, an indication of a percentage of the quantity of interference-based beam failure indicators or the quantity of noise-based beam failure indicators relative to a total quantity of beam failure indicators detected by the UE.

17. The apparatus of claim 15, wherein the processing system is further configured to cause the apparatus to:
obtain, in the report, an indication of a pattern associated with the quantity of interference-based beam failure indicators, the quantity of noise-based beam failure indicators, or both.

18. The apparatus of claim 15, wherein the processing system is further configured to cause the apparatus to:
obtain, in the report, an indication of a set of consecutive beam failure indicators over a set of transmission time intervals detected by the UE, the set of consecutive beam failure indicators associated with one of the quantity of interference-based beam failure indicators or the quantity of noise-based beam failure indicators.

19. The apparatus of claim 15, wherein the processing system is further configured to cause the apparatus to:
obtain, in the report, an indication of a report history for each of the quantity of interference-based beam failure indicators and the quantity of noise-based beam failure indicators.

20. The apparatus of claim 15, wherein the processing system is further configured to cause the apparatus to:
output, to the UE, a second control message indicating a reporting configuration for reporting the information, wherein the report is obtained in accordance with the reporting configuration.

21. A method for wireless communications at a user equipment (UE), comprising:
receiving, from a network entity, a set of one or more control messages indicating a set of one or more parameters associated with measurement, by the UE, of one or more reference signals;
receiving the one or more reference signals in accordance with the set of one or more parameters; and
transmitting, to the network entity, a report comprising information related to a quantity of interference-based beam failure indicators and a quantity of noise-based beam failure indicators associated with the measurement of the one or more reference signals according to the set of one or more parameters.

22. The method of claim 21, further comprising:
incrementing a first counter associated with interference-based beam failure indicators based at least in part on a set of one or more identified interference-based beam failure indicators associated with the measurement of the one or more reference signals, wherein the quantity of interference-based beam failure indicators is included in the report based at least in part on the first counter.

23. The method of claim 22, further comprising:
incrementing a second counter associated with noise-based beam failure indicators based at least in part on a set of one or more identified noise-based beam failure indicators associated with the measurement of the one or more reference signals, wherein the quantity of noise-based beam failure indicators is included in the report based at least in part on the second counter.

24. The method of claim 21, wherein transmitting the report comprises:
transmitting, in the report, an indication of a percentage of the quantity of interference-based beam failure indicators or the quantity of noise-based beam failure indicators relative to a total quantity of beam failure indicators detected by the UE.

25. The method of claim 21, wherein transmitting the report comprises:
transmitting, in the report, an indication of a pattern associated with the quantity of interference-based beam failure indicators, the quantity of noise-based beam failure indicators, or both.

26. The method of claim 21, further comprising:
detecting a set of consecutive beam failure indicators over a set of transmission time intervals based at least in part on the measurement of the one or more reference signals, the set of consecutive beam failure indicators associated with one of the quantity of interference-based beam failure indicators or the quantity of noise-based beam failure indicators, wherein an indication of the set of consecutive beam failure indicators is included in the report.

27. A method for wireless communications at a network entity, comprising:
transmitting, to a user equipment (UE), a set of one or more control messages indicating a set of one or more parameters associated with measurement, by the UE, of one or more reference signals;
transmitting the one or more reference signals in accordance with the set of one or more parameters; and
receiving, from the UE, a report comprising information related to a quantity of interference-based beam failure indicators and a quantity of noise-based beam failure indicators associated with the measurement of the one or more reference signals according to the set of one or more parameters.

28. The method of claim 27, wherein receiving the report comprises:
receiving, in the report, an indication of a percentage of the quantity of interference-based beam failure indicators or the quantity of noise-based beam failure indicators relative to a total quantity of beam failure indicators detected by the UE.

29. The method of claim 27, wherein receiving the report comprises:
receiving, in the report, an indication of a pattern associated with the quantity of interference-based beam failure indicators, the quantity of noise-based beam failure indicators, or both.

30. The method of claim 27, wherein receiving the report comprises:
receiving, in the report, an indication of a set of consecutive beam failure indicators over a set of transmission time intervals detected by the UE, the set of consecutive beam failure indicators associated with one of the quantity of interference-based beam failure indicators or the quantity of noise-based beam failure indicators.

* * * * *